United States Patent [19]

Limberg

[11] Patent Number: 5,555,024
[45] Date of Patent: Sep. 10, 1996

[54] TRANSMITTERS FOR BURYING DIGITAL SIGNALS WITHIN THE TRACE AND RETRACE INTERVALS OF NTSC TELEVISION SIGNALS

[75] Inventor: Allen L. Limberg, Vienna, Va.

[73] Assignee: Samsung Electronics Co., Ltd., Suwon, Rep. of Korea

[21] Appl. No.: 524,488

[22] Filed: Sep. 7, 1995

Related U.S. Application Data

[63] Continuation of Ser. No. 363,115, Dec. 23, 1994, abandoned.

[51] Int. Cl.$^6$ ........................................... H04N 7/08
[52] U.S. Cl. ................ 348/473; 348/434; 348/436; 348/476; 348/486
[58] Field of Search ........................ 348/486, 478, 348/473, 436, 435, 434; H04N 7/00, 11/00

[56] References Cited

U.S. PATENT DOCUMENTS

| | | | |
|---|---|---|---|
| 3,924,060 | 12/1975 | Bedford | 348/486 |
| 4,051,532 | 9/1977 | Hilbert et al. | 348/473 |
| 4,424,593 | 1/1984 | Kahn | 455/47 |
| 4,556,973 | 12/1985 | Uemura | 370/69.1 |
| 4,969,041 | 11/1990 | O'Grady et al. | 348/473 |
| 4,985,769 | 1/1991 | Yasumoto et al. | 348/473 |
| 5,200,822 | 4/1993 | Bronfin et al. | 348/473 |
| 5,229,847 | 7/1993 | Gibson | 348/486 |
| 5,386,240 | 1/1995 | Hori | 348/473 |
| 5,387,941 | 2/1995 | Montgomery et al. | 348/473 |

FOREIGN PATENT DOCUMENTS

| | | | |
|---|---|---|---|
| 0356903 | 3/1990 | European Pat. Off. | H04N 7/04 |
| 62-236288 | 10/1987 | Japan | H04N 7/08 |
| 9022984 | 12/1992 | WIPO | H04N 7/08 |

OTHER PUBLICATIONS

Patrick T. King, "A Novel TV Add–On Data Communication System", IEEE Transactions on Broadcasting and Television Receivers vol. BTR–19, No. 4, pp. 225–230, Nov. 1973.

Patrick T. King, "A Novel Television Add–On Data Communication System", Journal of the SMPTE, vol. 83, No. 1–Jan. 1974 pp. 10–13.

*Primary Examiner*—Victor R. Kostak
*Assistant Examiner*—Nathan J. Flynn

[57] ABSTRACT

An NTSC television signal transmitter also transmits through the same transmission channel a suppressed data carrier having a frequency differing from that of video carrier, having a symbol rate that is a multiple of horizontal scanning rate of video signal, having data frames occurring at a data frame rate that is the same as the video frame rate, and transmitting the symbols transmitted in each of alternate data frames in opposite phase during the next data frame. The data carrier has no image on the other side of the video carrier and preferably its modulation spectrum overlaps the video carrier. A digital-signal receiver can recover data from such a data carrier buried in an NTSC television signal, using frame-comb filtering to separate data from interfering video signal.

41 Claims, 18 Drawing Sheets

TRANSMITTERS FOR BURYING DIGITAL SIGNALS WITHIN THE TRACE AND RETRACE INTERVALS OF NTSC TELEVISION SIGNALS

This is a Continuation of application Ser. No. 08/363,115, filed on Dec. 23, 1994, which was abandoned upon the filing hereof.

The invention relates to transmitters for burying digital signals in analog television signals, which digital signals are present during trace as well as retrace intervals.

BACKGROUND OF THE INVENTION

Relatively low-power (e.g., 10 dB above noise floor) signals encoding digital information can be admixed together with composite video signals without being readily evident in television pictures generated from those composite video signals, if suitable restrictions on the digital signal format are observed.

A. L. R. Limberg, C. B. Patel and T. Liu in their U.S. patent application Ser. No. 08/108,311 filed 20 Aug. 1993, entitled APPARATUS FOR PROCESSING MODIFIED NTSC TELEVISION SIGNALS, WITH DIGITAL SIGNALS BURIED THEREWITHIN, and incorporated by reference herein describe phase-shift-keying (PSK) modulation of a subcarrier of the VSB AM carrier that is in quadrature phasing with the VSB AM video carrier of the same frequency. The frequency of their subcarrier is an odd multiple of one-half scan line frequency, and it is phase-shift-keyed in accordance with serial-bit digital data supplied at a symbol rate that is a multiple of scan line frequency. Limberg et alii prefer transmitting frames of the modulated subcarrier twice, but in opposite phasing in each successive pair of consecutive frames of the NTSC television signal. Because of frame-averaging effects resulting from the limitations on the speed of the response of the human visual system and on the speed of the decay of electroluminescence of kinescope phosphors, such repetition of data in pairs of frames makes PSK subcarrier accompanying the composite video signal detected from the NTSC television signal less visible in images that are generated from the composite video signal for viewing on a screen. Such repetition of data in pairs of frames also provides a basis for using frame-comb filtering in a digital-signal receiver to separate PSK subcarrier from the luminance portion of the composite video signal that describes static portions of successive television images. Limberg et alii prefer also repeating the modulation of the digital data in antiphase in contiguous pairs of adjoining scan lines of the NTSC television signal, providing a basis for using line-comb filtering in the digital-signal receiver to separate PSK subcarrier from the chrominance portion of the composite video signal.

Limberg et alii describe a digital-signal receiver in which the synchronous video detector for quadrature-phase VSB AM video carrier is followed by a cascade connection of a lowpass line-comb filter and a highpass frame-comb filter. The lowpass line-comb filter is for separating the frequency spectrum of a PSK subcarrier having a frequency that is an odd multiple of half-scan-line frequency from chrominance signal portions of the frequency spectrum of an NTSC signal, particularly of an NTSC signal that has been appropriately pre-filtered. The highpass frame-comb filter is for separating the frequency spectrum of a PSK subcarrier having a frequency that is an odd multiple of half-scan-line frequency from motion-free luminance signal portions of the frequency spectrum of an NTSC signal. Limberg et alii teach that the remnant spectrum of the NTSC signal in the response of the cascaded highpass comb filters can be viewed as the frequency spectrum of a jamming signal accompanying the PSK signal. Accordingly, the remnant spectrum of the NTSC signal in the response of the cascaded highpass comb filters can be discriminated against by synchronous symbol detection.

U.S. patent application Ser. No. 08/141,070, filed 26 Oct. 1993 by J. Yang, entitled APPARATUS FOR PROCESSING NTSC TV SIGNALS HAVING DIGITAL SIGNALS ON QUADRATURE-PHASE VIDEO CARRIER and incorporated herein by reference, describes binary phase-shift-keyed (BPSK) modulation of a suppressed carrier that is the same frequency as a video carrier and is in quadrature phasing therewith. The suppressed carrier is phase-shift-keyed directly, without any subcarrier being used. Yang also advocates transmitting frames of the modulated subcarrier twice, but in opposite phasing in each successive pair of consecutive frames of the NTSC television signal, just as Limberg et alii do. Yang advocates the BPSK signals being constrained to about 2 MHz bandwidth, so as to avoid crosstalk into chroma in TV receivers that separate chroma from luma without recourse to comb filtering. Yang indicates a preference for passing the data to be transmitted through a pre-line-comb partial-response filter prior to its digital-to-analog conversion to an analog modulating signal for a balanced amplitude modulator. This is done to preserve the information contained therein when line-comb filtering is done in the digital-signal receiver to separate PSK subcarrier from the luminance portion of the composite video signal. Line-comb filtering in the digital-signal receiver converts the partial-response filtered binary digital signal to ternary digital signal, if the line-comb filtering is of the two-tap type, linearly combining signals differentially delayed by only the duration of one horizontal scan line of video signal. Line-comb filtering in the digital-signal receiver converts the partial-response filtered binary digital signal to five-level digital signal, if the line-comb filtering is of the three-tap type, linearly combining signals differentially delayed by the duration of one horizontal scan line of video signal and by the duration of two horizontal scan lines of video signal. Therefore, multi-level symbol decision circuitry is required to recover bit-serial digital data transmitted by the BPSK from the comb filtering response.

U.S. patent application Ser. No. 08/179,616 filed 5 Jan. 1994 by J. Yang and A. L. R. Limberg, entitled "PRE-FRAME-COMB" AS WELL AS "PRE-LINE-COMB" PARTIAL-RESPONSE FILTERING OF BPSK BURIED IN A TV SIGNAL and incorporated herein by reference, describes the digital signal transmitter using a pre-frame-comb partial-response filter as well as pre-line-comb partial-response filtering for processing bit-serial data from which BPSK modulating signal is generated for the carrier in quadrature phasing with the video carrier. Line-comb filtering in the digital-signal receiver converts the partial-response filtered binary digital signal to five-level digital signal, if the line-comb filtering is of the two-tap type, linearly combining signals differentially delayed by only the duration of one horizontal scan line of video signal. Line-comb filtering in the digital-signal receiver converts the partial-response filtered binary digital signal to nine-level digital signal, if the line-comb filtering is of the three-tap type, linearly combining signals differentially delayed by the duration of one horizontal scan line of video signal and by the duration of two horizontal scan lines of video signal.

U.S. patent application Ser. No. 08/179,588 filed 5 Jan. 1994 by J. Yang and A. L. R. Limberg, entitled APPARA- TUS FOR PROCESSING BPSK SIGNALS TRANSMITTED WITH NTSC TV ON QUADRATURE-PHASE VIDEO CARRIER, and incorporated herein by reference, describes BPSK modulating signal for the carrier in quadrature phasing with the video carrier being generated directly from bit-serial data without any pre-comb-filter partial-response filtering. The same patent application describes digital-signal receivers, which use a cascade connection of a highpass frame-comb filter and a highpass line-comb filter after the quadrature video detector to suppress interfering remnant luminance signal, which use plural-level symbol decision circuitry for the comb filter response, and which use post-comb-filter partial-response filtering after the symbol decision circuitry for undoing the data alteration caused by the comb filtering.

Receivers for the Yang system are also described by T. V. Bolger in his U.S. patent application Ser. No. 08/141,071 filed 26 Oct. 1993, entitled RECEIVER WITH OVERSAMPLING ANALOG-TO-DIGITAL CONVERSION FOR DIGITAL SIGNALS WITHIN TV SIGNALS, and incorporated herein by reference. These receivers digitize the response of a quadrature-phase video detector using an oversampling analog-to-digital converter. The digitized quadrature-phase video detector response is subjected to digital frame-comb and line-comb filtering to suppress remnant composite video signals; the comb filtering response is supplied to multi-level symbol decision circuitry to recover bit-serial digital data transmitted by the BPSK; and the bit-serial digital data is supplied to a decoder that corrects the digital information in the data using forward-error-correcting codes contained therein.

Receivers for the Yang system are also described by J. Yang, T. V. Bolger and A. L. R. Limberg in their U.S. patent application Ser. No. 08/179,586 filed 5 Jan. 1994, entitled RECEIVER WITH SIGMA-DELTA ANALOG-TO-DIGITAL CONVERSION FOR DIGITAL SIGNALS BURIED IN IV SIGNALS, and incorporated herein by reference. These receivers digitize the response of a quadrature-phase video detector using an oversampling analog-to-digital converter of sigma-delta type. Preferably, the bit resolution of a basic multiple-bit-resolution flash converter is improved by using a sigma-delta procedure in which only a single bit of the basic multiple-bit-resolution ADC output signal is converted back to analog signal for feedback purposes during each oversampling step, as described by T. C. Leslie and B. Singh in their paper "An Improved Sigma-Delta Modulator Architecture", 1990 IEEE SYMPOSIUM ON CIRCUITS & SYSTEMS, 90 CH 2868-8900000-0372, pp. 372–375, incorporated herein by reference. The digitized quadrature-phase video detector response is subjected to digital frame-comb and line-comb filtering to suppress remnant composite video signals; the comb filtering response is supplied to multi-level symbol decision circuitry to recover bit-serial digital data transmitted by the BPSK; and the bit-serial digital data is supplied to a decoder that corrects the digital information in the data using forward-error-correcting codes contained therein.

Data can be included in all horizontal scan lines, including all horizontal scan lines in the vertical blanking interval, and data frames started after the vertical sync pulse interval. Alternatively, data frames can begin with the 22nd horizontal scan line of each odd field of composite video signal with data not being transmitted during the 18th through 21st lines of each field of composite video signal. This practice is preferred since it avoids any changes with regard to the 19th lines being used for ghost cancellation reference (GCR) signals, the 20th lines being used for video facsimile transmissions, and the 21st lines being used for closed caption information.

The bandwidths available from the systems described in the patent applications referred to above accommodate the transmission of 5.1-channel Dolby AC-3 audio or MPEG audio.

The inventions described in the patent applications referred to above, like the inventions described herein, are assigned to Samsung Electronics Co., Ltd., pursuant to pre-existing employee agreements to so assign inventions made within the scope of employment.

By exercise of the superposition theorem for linear systems, the output spectrum of an amplitude-modulation (AM) transmitter having a main carrier amplitude-modulated by a modulating signal including an amplitude-modulated subcarrier can be analogized to the composite spectrum of a first component AM transmitter having a first carrier at main carrier frequency ampitude-modulated by a modulating signal not having the amplitude-modulated subcarrier, a second component AM transmitter having a second carrier above the first carrier in frequency and offset therefrom by a particular phase of the subcarrier frequency, and a third component AM transmitter having a third carrier below the first carrier in frequency and offset therefrom by a particular phase of the subcarrier frequency. The second and third carriers are respectively images of each other on opposite sides of the first carrier to the extent that the third carrier and its modulation sidebands are not suppressed by the vestigial sideband filter. U. S. patent application Ser. No. 08/108,311 advocates a phase relationship between the main carrier and the subcarriers such that the amplitude modulation of the subcarrier is orthogonal to amplitude modulation of the main carrier. The subcarriers modulate the amplitude of an auxiliary carrier of the same frequency as the main carrier and in quadrature phase relationship with the main carrier.

If the subcarrier frequency is high enough, vestigial sideband filtering will eliminate portions of one of the sidebands of the first carrier from the first component AM transmitter and will eliminate the contribution of one of the second and third component AM transmitters from the composite spectrum. Accordingly, that one of the second and third component AM transmitters can be omitted for analytical purposes. In NTSC television the lower sideband of the first carrier is vestigial, so that the contribution of the third component AM transmitter is filtered from the composite spectrum. If the subcarrier frequency is low enough and if the subcarrier sidebands do not extend too far, vestigial sideband filtering will eliminate portions of one of the sidebands of the first carrier from the first component transmitter, but the contributions of both of the second and third component AM transmitters will be retained in the composite spectrum. Analyzing the composite AM spectrum as the superposition of the individual AM spectra in this way establishes a theoretical structure, or analytical model, to support further analysis as underlies the inventions disclosed within this specification.

If one modifies the analytical model to eliminate one of the second and third component AM transmitters altogether, the first component AM transmitter and the remaining one of the second and third component AM transmitters are normally viewed as having individual carriers, the associated frequency spectra of which overlap. However, if the modulation of the carrier of the remaining one of the second and third component AM transmitters was done in such manner as to allow comb filtering to separate that modulation from the modulation of the first component AM transmitter, this separation capability is unaffected by the elimination of one of the second and third component AM transmitters, it is here pointed out. Accordingly, even though an NTSC television signal has buried therewithin a data carrier that does not include image components on each side of the video carrier, the data carrier can be related to the video carrier so as to reduce the visibility of the data in the televised images as reproduced on a television screen, but at the same time permit the frequency spectrum of the data carrier modulation to overlap a substantial portion of the NTSC television signal spectrum. Furthermore, the modulation of the data carrier can be such as to facilitate the separation of the data from video using comb filtering. It is here also pointed out that, if the first component AM transmitter and the remaining one of the second and third component AM transmitters had specific relationships concerning the offset in frequency and phase of their respective carriers that tended to interleave the frequency spectra of their respective modulated carriers in a desirable way, these relationships are affected by the elimination of one of the second and third component AM transmitters only to the extent that during synchronous detection there will be no cancellation of the heterodyne products from the respective carriers of the second and third component AM transmitters. These conclusions flow from consideration of the superposition theorem for linear systems and the separability of the functions describing the modulation results of the first, second and third component AM transmitters.

This means that in a digital-signal receiver the phase of the data carrier, which is suppressed, can still be determined from the phase of the video carrier, which is not suppressed, by regenerating the offset using information from the horizontal scan synchronizing pulses the ghost cancellation reference (GCR) signals or color burst information.

The elimination of one of the second and third component AM transmitters avoids certain problems caused by the interference of their respective modulation spectra.

Where the data carrier is double-sideband (DSB) in nature with both lower-frequency and upper-frequency sidebands having appreciable energy above 750 kHz or so, it is necessary to retain the one of the second and third component AM transmitters having its carrier on the side of the first carrier with a full modulation sideband. The character of the modulation of the data carrier can be QPSK, MPSK, QAM or DSB BPSK. Since there is no interfering image carrier, the carrier frequency of that retained component AM transmitter can be chosen closer to the frequency of the first carrier and the modulation bandwidth increased to utilize the frequency range including the first carrier and its vestigial sideband.

In U.S. patent application Ser. No. 08/108,311 a single-sideband (SSB) binary-phase-shift-keyed (BPSK) data subcarrier was advocated, with the data subcarrier being closer to the video carrier than its SSB BPSK modulation sideband; and the detection of that data subcarrier required suppression of one of the video carrier sidebands, so that the image of the data subcarrier would not interfere with its detection. The elimination of one of the second and third component AM transmitters avoids there being any image of the data carrier that has to be suppressed before the detection of the data carrier can proceed. Retaining the one of the second and third component AM transmitters having its carrier on the side of the first carrier with a full modulation sideband does not change the bandwidth available for the SSB BPSK modulation of the carrier of the retained one of the second and third component AM transmitters, and the bandwidth in the frequency range including the first carrier and its vestigial sideband is not utilized by the SSB BPSK data carrier. Retaining the one of the second and third component AM transmitters having its carrier on the side of the first carrier with a vestigial sideband increases the bandwidth available for the SSB BPSK modulation of the carrier of the retained one of the second and third component AM transmitters, since the bandwidth in the frequency range including the first carrier and its vestigial sideband can be utilized by the SSB BPSK data carrier.

More generally, when an SSB BPSK data carrier is used, its carrier frequency can be chosen closer to one of the boundary frequencies of the transmission channel and its single sideband can be allowed to extend both sides of the video carrier.

SUMMARY OF THE INVENTION

An aspect of the invention is a transmitter for burying in an NTSC television signal a data carrier having a frequency differing from that of video carrier by a prescribed frequency offset, having a symbol rate that is a multiple of horizontal scanning rate of video signal, having data frames substantially overlapping respective frames of video, and transmitting the symbols transmitted in each of alternate data frames in opposite phase during the next data frame. Preferably, the prescribed frequency offset is an odd multiple of one-half horizontal scan line frequency. The data carrier has no image on the other side of the video carrier and preferably its modulation spectrum overlaps the video carrier. Such transmitter is suited for use with receivers for recovering data from such a data carrier buried in an NTSC television signal, which receivers synchronously detect the data carrier and use comb filtering to separate data from interfering artifacts of video signal in the result of synchronously detecting the data carrier. Preferably, the comb filtering includes frame-comb filtering.

Figure 9:
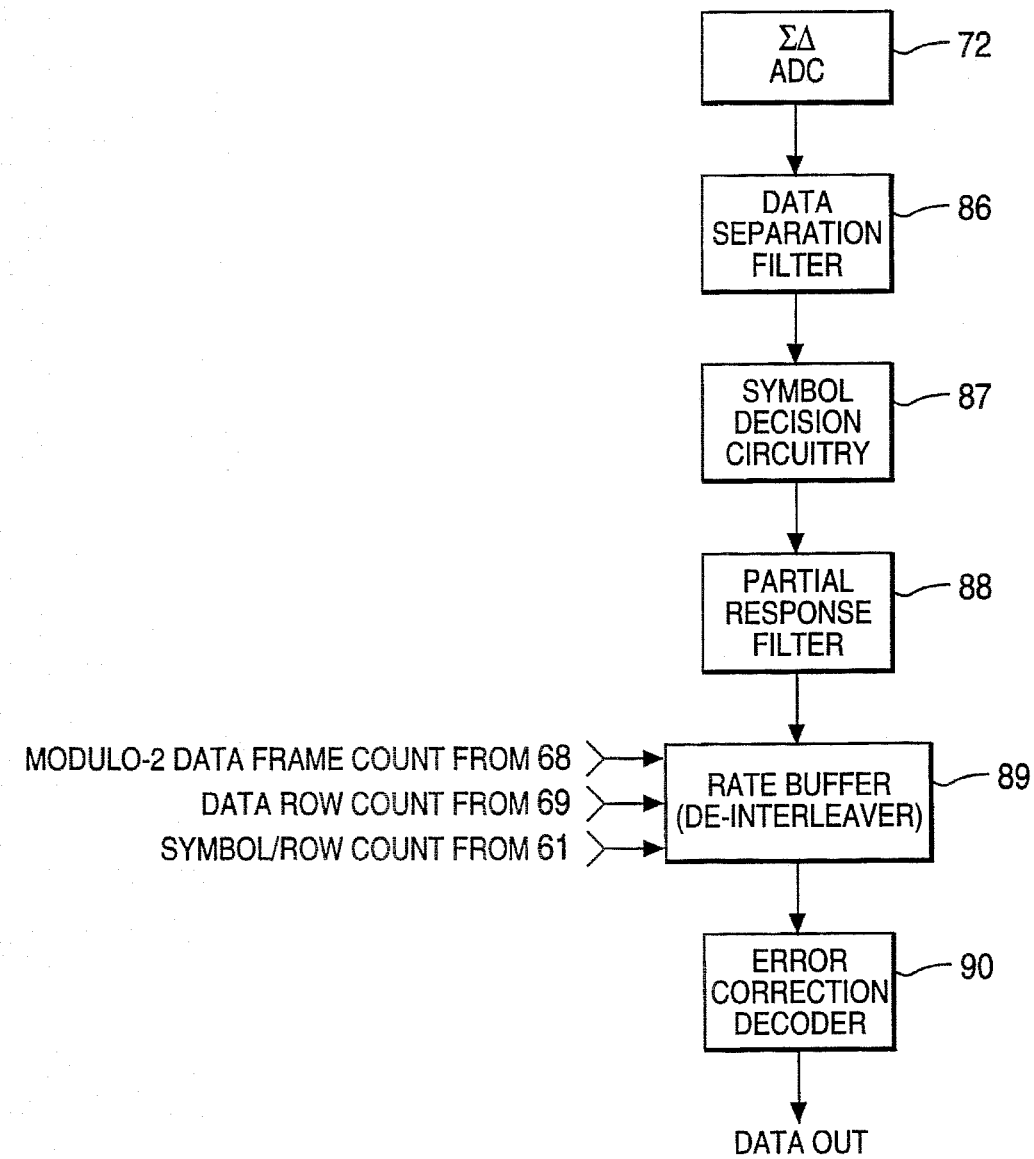

Each of FIGS. 12, 13, 14 and 15 is a schematic diagram of an alternative form the data separation filter, symbol decision circuitry and post-comb partial-response filter can take in the final portion of the digital-signal receiver circuitry shown in FIG. 9.

Figure 16:
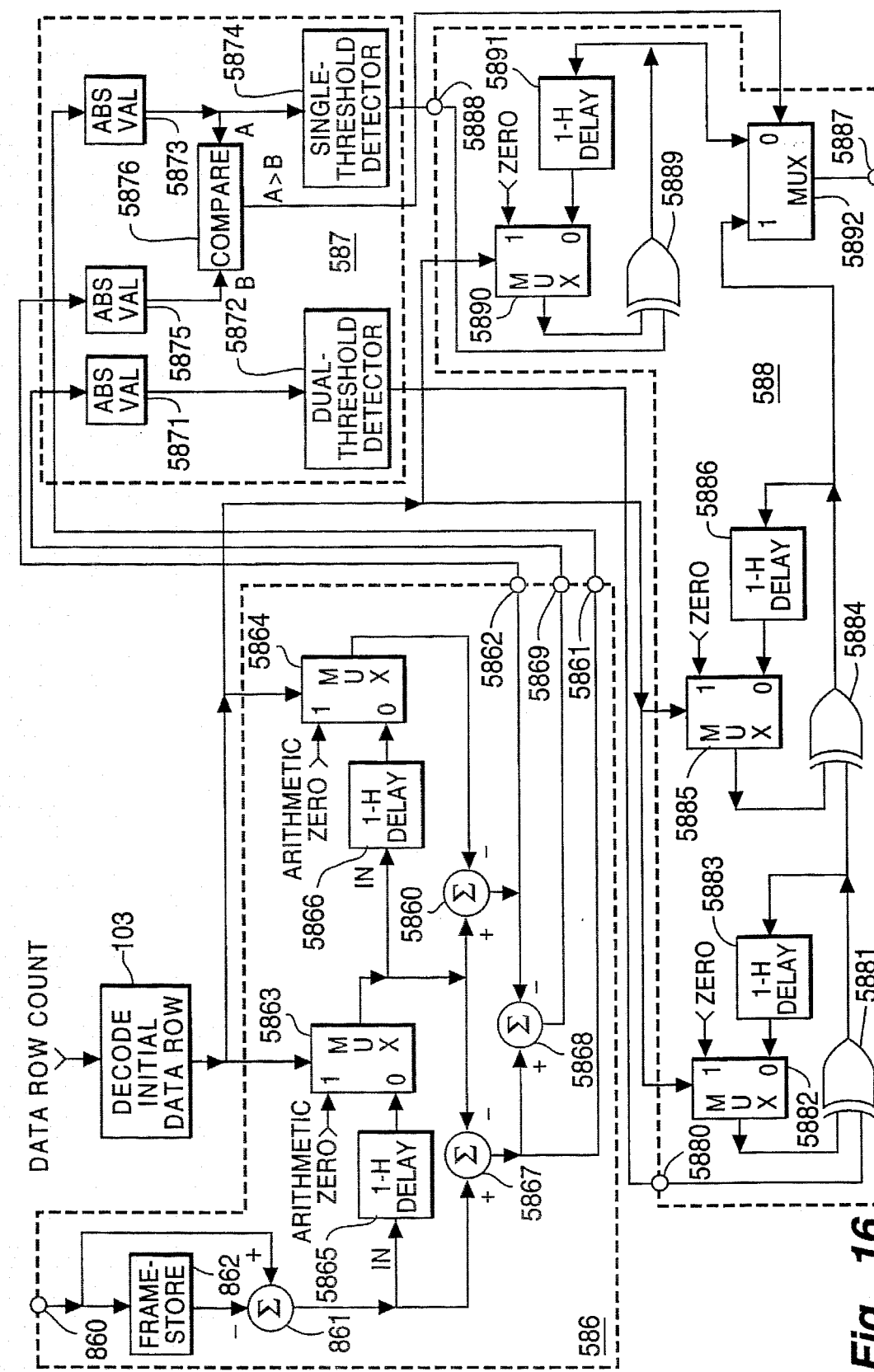

FIG. 16 is a schematic diagram of another form the data separation filter, symbol decision circuitry and post-comb partial-response filter can take, when the digital-signal receiver is of an adaptive type.

Figure 17:
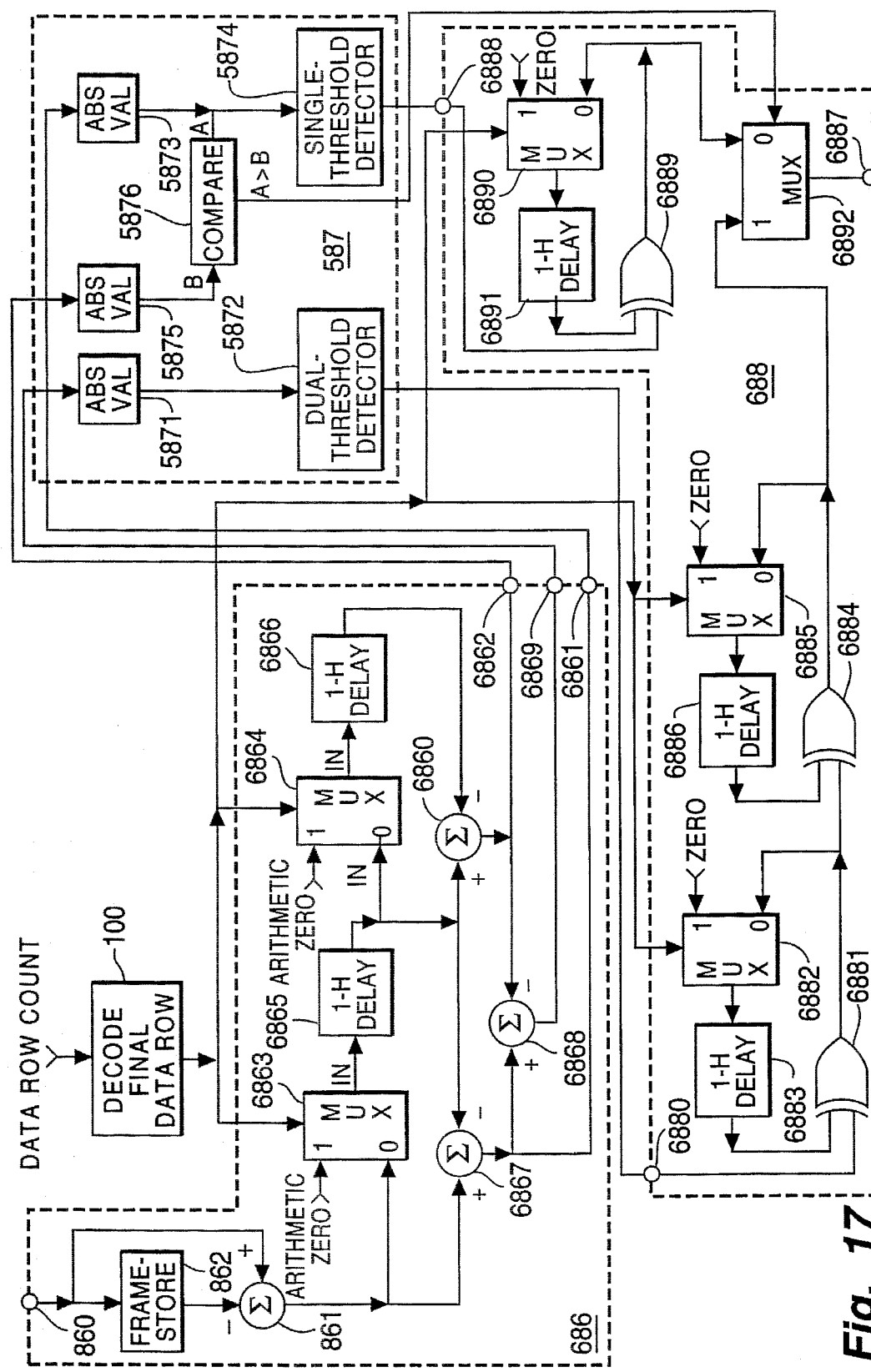

FIG. 17 is a schematic diagram of an alternative form the data separation filter, symbol decision circuitry and post-comb partial-response filter can take, when the digital-signal receiver is of an adaptive type.

Figure 18:
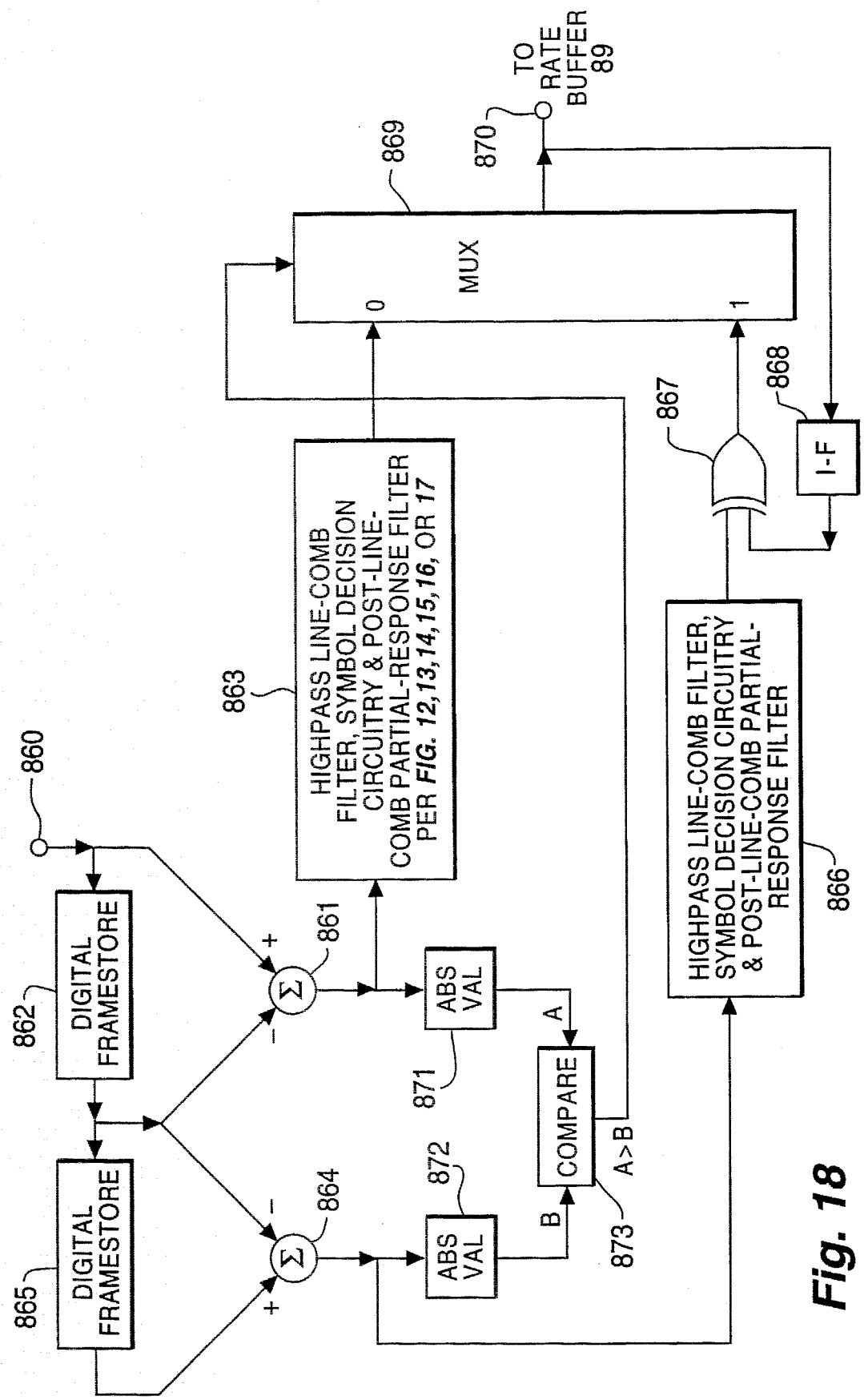

FIG. 18 is a schematic diagram of modifications that can be made in the digital-signal receiver, when that digital-signal receiver is of an adaptive type.

DETAILED DESCRIPTION

Generally, equalizing delays have been omitted from the drawing figures to simplify them and to make them easier to understand. One skilled in the art of video signal processor design will appreciate the need for such delays to properly time-align pixels or data subject to different delays on different processing paths due to the differing processing performed in those paths. One skilled in the art would understand where such delays would be necessary and how long each of the delays would have to be, and such delays will not be described or discussed below. In logic circuitry, one skilled in the art would understand how to provide the shimming delays required to overcome undesired "logic race" conditions or to compensate for latent delays in performing logic operations; and details of logic circuitry design with regard to providing shimming delay will not be discussed below. Further, where an analog-to-digital converter (ADC) is shown or described in the present disclosure, one skilled in the art would understand the desirability of preceding such converter with an anti-aliasing lowpass filter, and how this could be implemented, and such will not be further described in detail below. Also, where a digital-to-analog converter (DAC) is shown or described in the present disclosure, one skilled in the art would understand the desirability of following such converter with a sampling clock rejection lowpass filter, and how this could be implemented, and such will not be further described in detail below.

Figure 1:
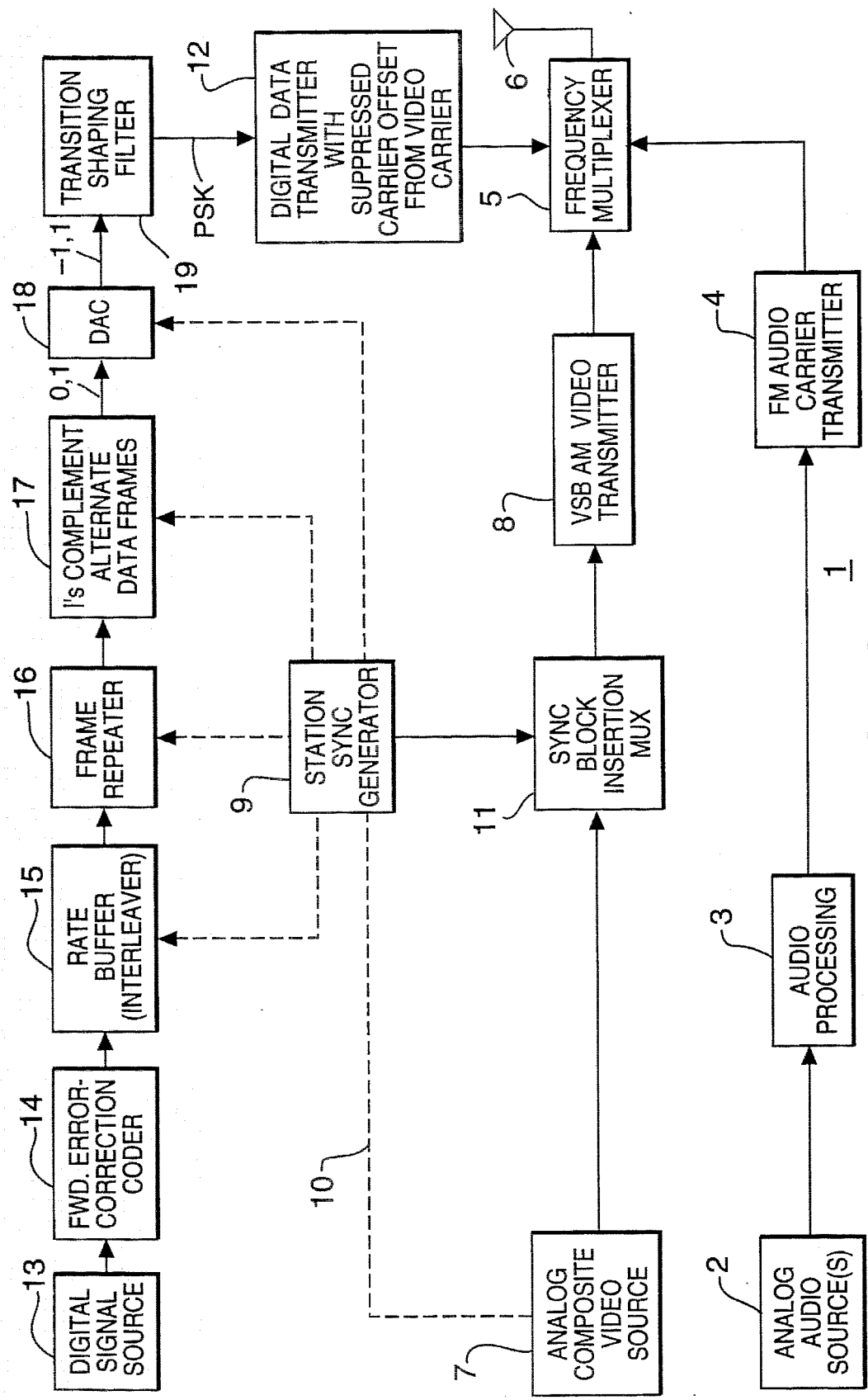
FIG. 1 is an overall schematic diagram of a television transmitter for transmitting a television signal with a digital signal buried therewithin, which television transmitter embodies aspects of the invention.

FIG. 1 shows a television transmitter 1 for transmitting a television signal with a digital signal buried therewithin. A source 2 supplies one or more analog audio signals to audio processing circuitry 3 which supplies a modulating signal to an audio carrier transmitter 4 for modulating the frequency of the audio carrier wave. The audio processing circuitry 3 includes delay as needed for synchronizing sound and picture. The audio processing circuitry 3, in accordance with customary practice, also includes pre-emphasis networks for the analog audio signal(s) and may include apparatus for generating stereophonic and secondary audio program (SAP) subcarriers for inclusion in the modulating signal supplied to the audio carrier transmitter 4. The frequency-modulated (FM) audio carrier is typically supplied from the transmitter 4 to a multiplexer 5 to be frequency-multiplexed with VSB AM picture carrier and with data carrier. In a television transmitter 1 for over-the-air broadcasting, this multiplexer 5 typically takes the form of an antenna coupling network and the resulting frequency-multiplexed signal is broadcast from a transmitting antenna 6. A television transmitter for the head end of a cable broadcasting system will not have the transmitting antenna 6 used in over-the-air broadcasting. The multiplexer 5 will take different form, with the frequency-multiplexed signal from the channel under consideration being further frequency-multiplexed with the frequency-multiplexed signals from other channels, and with the resulting signal being applied by linear amplifiers to the trunk cables of the cable broadcasting system.

In FIG. 1 a source 7 supplies an analog composite video signal that is the basis for the modulating signal supplied to a transmitter 8 that in turn supplies the VSB AM picture carrier to the multiplexer 5, there to be frequency-multiplexed with the frequency-modulated (FM) sound carrier. The vertical synchronizing pulses, horizontal synchronizing pulses and color burst of analog composite video signal from the source 7 are synchronized with corresponding signals supplied by a station synchronizing signal generator 9. A control connection 10 between the source 7 of composite video signal and the station sync generator 9 symbolizes the means used for this synchronization. Where the source 7 is a remote generator of composite video signal, such as a downtown studio or another television station networked with the local television station, the control connection 10 may be a genlock connection to the station sync generator 9. Where the source 7 is a local camera, that local camera may receive synchronization information from the station sync generator 9 via the control connection 10. These and other synchronizing schemes including those for video tape recorders and telecine apparatus are familiar to those skilled in the art. Typically, a time-division multiplexer 11 is used to insert sync block information including vertical synchronizing pulses, horizontal synchronizing pulses, equalizing pulses, color burst and pedestals (commonly referred to as "porches") into the composite video signal applied as modulating signal to the picture carrier transmitter 8 in place of original sync block information.

The FIG. 1 television transmitter 1 differs from those currently used in that a further AM transmitter 12 modulates a suppressed carrier in accordance with digital data, which suppressed carrier has a prescribed frequency offset from the video carrier. Preferably the carrier frequency of this digital data transmitter 12 is offset from the carrier frequency of the picture carrier transmitter 8 by a frequency that is an odd multiple of half scan line rate, assuming that the data is to be disposed in a frequency band that the luminance frequency spectrum overlaps and that the chrominance frequency spectrum is less likely to overlap. The symbol rate of the digital data transmitter 12 is a multiple of scan line rate. This further AM transmitter 12 can include a balanced modulator, balanced both against carrier and against modulating signal, and can further include circuitry for maintaining the prescribed offset between the video carrier and the carrier supplied to the balanced modulator in this transmitter 12. The modulated data carrier signal from the transmitter 12, like the VSB AM video carrier amplitude-modulated by NTSC composite video signal from the transmitter 8, is supplied to the multiplexer 5, there also to be frequency-multiplexed with the frequency-modulated (FM) sound carrier. The output signal from the AM transmitter 12 is filtered to suppress any out-of-channel components.

A source 13 of digital signal in parallel-bit form is supplied to an error-correction coder 14, which coder 14 converts the digital signal into a serial-bit stream into which additional bits of forward error-correcting code are inserted. This serial-bit stream is supplied from the coder 14 to a rate buffer 15. Rate buffer 15 preferably functions as an interleaver, as will be described in more detail further on in this specification, with reference to FIGS. 2 and 3. During every other data frame the rate buffer 15 writes a successive block of the forward error-corrected binary code to a frame repeater 16. The frame repeater 16 supplies each frame of data received as its input signal twice as its output signal. The output signal from the frame repeater 16 is supplied to circuitry 17 which one s complements the output signal from the frame repeater 16 on alternate data frames. The digital response from the circuitry 17 is supplied to a digital-to-analog converter (DAC) 18, for conversion to an analog keying signal. The DAC 18 supplies a high-frequency pre-emphasis and transition-shaping filter 19 with keying signal that is of a prescribed positive value responsive to a digital ZERO and is of a prescribed negative value responsive to a digital ONE. The prescribed negative level of analog modulating signal has the same absolute value as the prescribed positive level of analog modulating signal. The response of the filter 19 is a keying signal supplied to a balanced modulator in the transmitter 12, which balanced modulator also receives a carrier wave to be modulated. While FIG. 1 shows the transmitters 8 and 12 as being separate from each other, in practice the same upper sideband filters and final amplifier stages can be shared by the transmitters 8 and 12. The filtering of the output signal from the AM transmitter 12 to suppress any out-of-channel components will then be done in whole or in part by the vestigial sideband filtering for the picture carrier transmitter 8.

Figure 2:
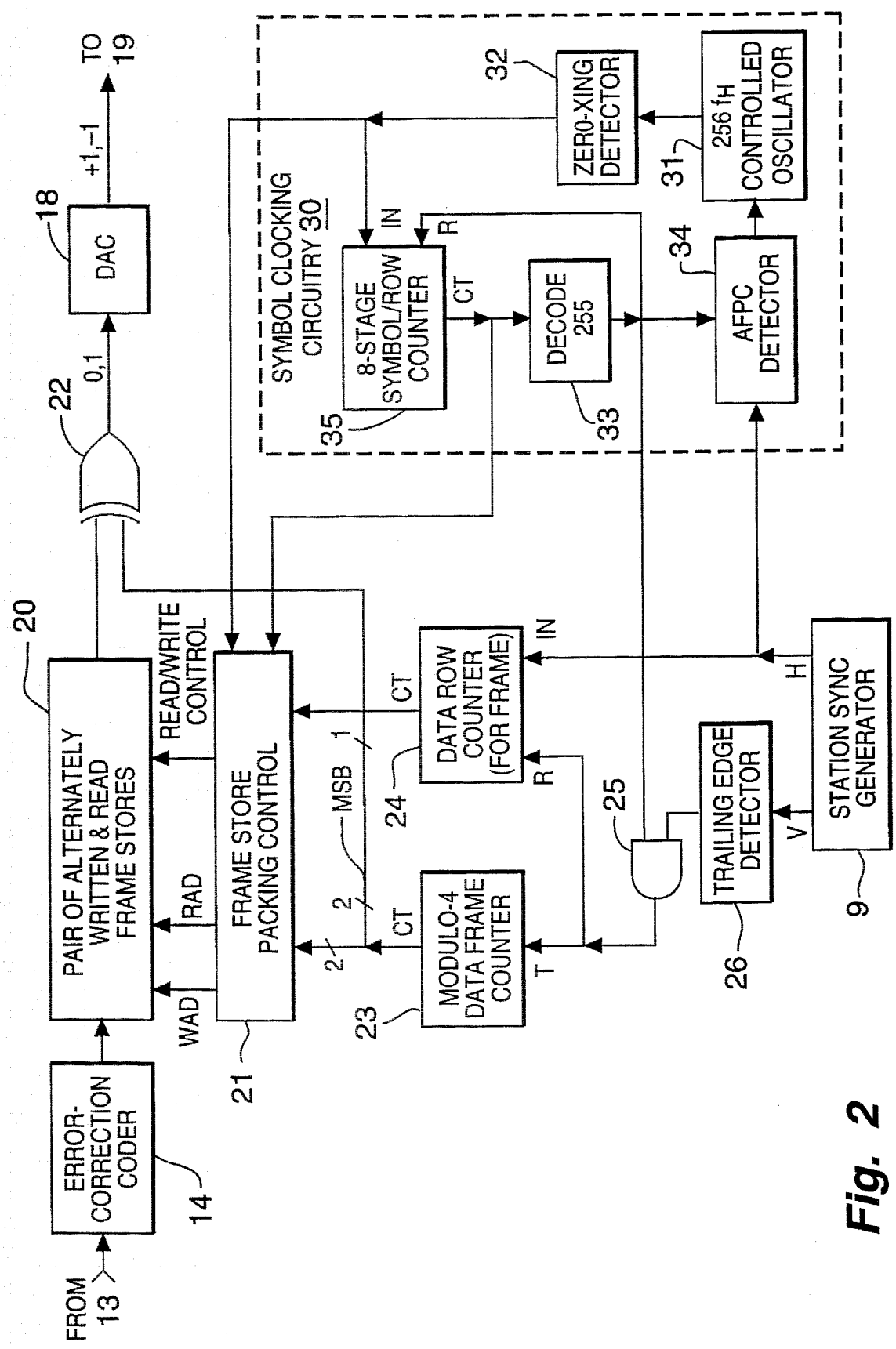
FIG. 2 is a schematic diagram showing in detail a portion of the FIG. 1 television transmitter used for processing the digital data from which the phase-shift keying signal is to be generated, which phase-shift keying signal modulates a suppressed data carrier.

FIG. 2 shows in more detail the construction of the portion of the TV transmitter 1 used for digitally filtering the digital data from which the phase-shift keying signal is to be generated. The error-correction coder 14 supplies digital signal in serial-bit form to a pair 20 of digital framestores that, under the control of framestore-packing-control circuitry 21, function as both the rate buffer 15 and the frame repeater 16. Preferably, the coder 14 is of a type generating modified Reed-Solomon codes; and the pair 20 of digital framestores perform further service as an interleaver. The addressing and operation of the pair 20 of digital framestores will be explained in more detail further on in this specification, with reference to FIG. 3 of the drawing.

Interleaver operation of the pair 20 of digital framestores places the original order of the scanning of data in columns, transverse to rows of data ultimately transmitted by the VSB BPSK data transmitter 12 simultaneously with respective horizontal scan lines of the composite video signal being transmitted by the VSB AM video transmitter 8. This is done so impulse noise and midband frequencies of composite video signal, which tend to have coherence in the horizontal direction, jam fewer bits of the modified Reed-Solomon codes than would be the case with modified Reed-Solomon codes operating on data mapped into rows along horizontal scan lines, rather than on data mapped into columns transverse to horizontal scan lines.

Data frames are defined as blocks of 525 rows of symbols which occur at a symbol rate that is a multiple of data row scan rate, which data row scan rate is the same as the horizontal scan line rate for analog composite video signal. BPSK symbols are bits, but the symbols to which the modified Reed-Solomon codes are applied are customarily 2 N-bit data, N being a small positive integer such as three, four or five. The bit length over which each of the modified Reed-Solomon codes extends is chosen to be less than 525 (e. g., 256 or 512), so that impulse noise is less likely to disrupt any one of the modified Reed-Solomon codes more than once along its length. The relative phasing of the data rows and the horizontal scan lines of composite video signal is such that each data row as read from the pair 20 of digital framestores coincides in time with a respective horizontal scan line of composite video signal.

Data frames are read from the pair 20 of digital framestores at the same rate as the frames of the analog composite video signal are supplied by the source 7, but preferably the data frames lag the video signal frames by a prescribed number of horizontal scan lines. If data are not transmitted during the 18th through 21st lines of each field of composite video signal, one may choose to have data frames begin with the 22nd horizontal scan line of each odd field of composite video signal. It is more convenient to start the data frames just after the vertical sync pulse interval, however, particularly if data are transmitted during all horizontal scan lines, including all horizontal scan lines in the vertical blanking interval.

Each of the pair 20 of digital framestores is read the first data frame following its being written and is re-read before re-writing in the second data frame following its being written, to generate output signal supplied as input signal to a first input of a two-input exclusive-OR gate 22 during respective frames of consecutive pairs of data frames. During the course of the pair of consecutive data frames one of the pair 20 of digital framestores is read and then re-read data row by data row, while the other of the pair 20 of digital framestores is written. This writing is done data column by data column, if the pair 20 of digital framestores is operated as an interleaver. A frame counter at the transmitter 1 is used to count eight-field cycles for controlling the insertion of ghost-canceling reference signals into the composite video signals during selected vertical-blanking interval (VBI) scan lines. This frame counter includes among its stages a modulo-4 data frame counter 23 for supplying a MODULO-4 DATA FRAME COUNT signal used by the framestore-packing-control circuitry 21. The more significant bit of the MODULO-4 DATA FRAME COUNT signal is supplied by the packing-control circuitry 21 to the pair 20 of digital framestores for selecting which is to be written and which is to be read.

The less significant bit of the MODULO-4 DATA FRAME COUNT signal is a MODULO-2 DATA FRAME COUNT signal supplied from the counter stage 231 in the counter 23 to the second input of the XOR gate 22. The logic ONE applied to the second input of the XOR gate 22 during the first reading of a frame of data from one of the pair 20 of digital framestores causes the XOR gate 22 to supply the DAC 18 the one s complements of the data read for the first time from the framestore memory to the first input of the XOR gate 22. The logic ZERO applied to the second input of the XOR gate 22 during the second reading of a frame of data from one of the pair 20 of digital framestores causes the XOR gate 22 to supply the DAC 18 a replica of the data read for the second time from the framestore memory to the first input of the XOR gate 22. The XOR gate 222 and the least-significant-bit stage of the counter 23 of FIG. 2 together comprise the circuitry 17 of FIG. 1, which circuitry 17 one's complements the output signal from the frame repeater 16 on alternate data frames.

In addition to receiving the MODULO-4 DATA FRAME COUNT signal from the counter 23, the packing-control circuitry 21 receives a DATA ROW COUNT signal from a data row counter 24 and a SYMBOL-PER-ROW COUNT signal from a symbol-per-row counter 35. The packing-control circuitry 21 applies the DATA ROW COUNT as data row read addressing to the one of the pair 20 of digital framestores selected to be read from and applies the SYMBOL-PER-ROW COUNT as within-row read addressing to that framestore selected to be read from. DATA ROW COUNT and SYMBOL-PER-ROW COUNT together comprise the complete read addressing RAD that FIG. 2 shows the packing-control circuitry 21 supplying to the pair 20 of digital framestores for application to the one selected for being read from. The packing-control circuitry 21 also generates write addressing WAD supplied to the one of the pair 20 of digital framestores selected for being written to.

FIG. 2 shows symbol clocking circuitry 30 that includes, in addition to the symbol-per-row counter 35, a voltage-controlled oscillator (VCO) 31, a zero-crossing detector 32, a 255-count decoder 33 and an automatic frequency and phase control (AFPC) detector 34. The symbol-per-row counter 35 comprises eight binary counting stages. The zero-crossing detector 32, which might be more properly termed an average-axis-crossing detector, generates a pulse whenever the sinusoidal oscillations of the oscillator 30 cross their average axis in a prescribed direction. The zero-crossing detector 32 customarily comprises a limiter amplifier that generates square waves responsive to the sinusoidal oscillations of the VCO 31, a differentiator for generating pulses responsive to transitions of these square waves, and a clipper for separating pulses of one polarity to be supplied to the framestore-packing-control circuitry 21 for timing purposes. These pulses are also supplied to the symbol-per-row counter 35 to be counted in each consecutive line, thereby to generate the SYMBOL-PER-ROW COUNT signal supplied to the packing-control circuitry 21. The 255-count decoder 33 decodes the SYMBOL-PER-ROW COUNT reaching 255 to generate a pulse. Instead of letting the SYMBOL-PER-ROW COUNT simply roll over to arithmetic zero because full count is an integral power of two, each pulse from the 255-count decoder 33 can be used to reset the counter 35 on the next pulse supplied to the counter 35 by the zero-crossing detector 32, thus returning SYMBOL-PER-ROW COUNT to arithmetic zero. The 255-count decoder 33 supplies pulses to the AFPC detector 34, to be compared with the horizontal sync pulses H to develop an AFPC voltage supplied to the VCO 31. This completes a negative feedback loop that adjusts the frequency of the VCO 31 oscillations to be 256 times the horizontal scan line frequency, or 4 027 972 Hz.

One way of synchronizing counting by the frame counter 23 and the data row counter 24 with the frames of analog composite video signal will now be considered. In a digital-signal receiver for a system as described in this specification, the counter that regenerates DATA FRAME COUNT is synchronized to the beginning of line ten of each frame of the analog composite video signal, just after the trailing edge of the vertical sync pulse in the initial field of such frame. In such case, the counter that generates DATA ROW COUNT in the digital-signal receiver is reset to prescribed count value at the beginning of line ten of each frame of the analog composite video signal. The synchronizing of the counting by the modulo-4 data frame counter 23 and the data row counter 24 in the portion of the transmitter 1 shown in FIG. 2 conforms to the desired receiver practice.

The 255-count decoder 33 output signal is supplied as a first input signal to a two-input AND gate 25. The station sync generator 9 supplies vertical sync pulses V to a trailing edge detector 26, which supplies pulses at the conclusions of lines 9 of composite video signal and at the midpoints of lines 271 of composite video signal output signal is supplied as a second input signal to the AND gate 25. The response of the AND gate 25 consists of DATA-FRAME-END pulses at the conclusions of lines 9 of composite video signal. Each of these DATA-FRAME-END pulses is applied as a trigger pulse to the modulo-4 data frame counter 23, so as to advance the DATA FRAME COUNT signal, and is also applied to the data row counter 24 to reset its DATA ROW COUNT to prescribed initial value. In practice, the 255-count decoder 33 may be dispensed with, and the carry pulses from the final binary counting stage of the symbol counter 35 may be supplied to the AFPC detector 34 and to the AND gate 25, instead of the decoder 33 output signal.

Figure 3:
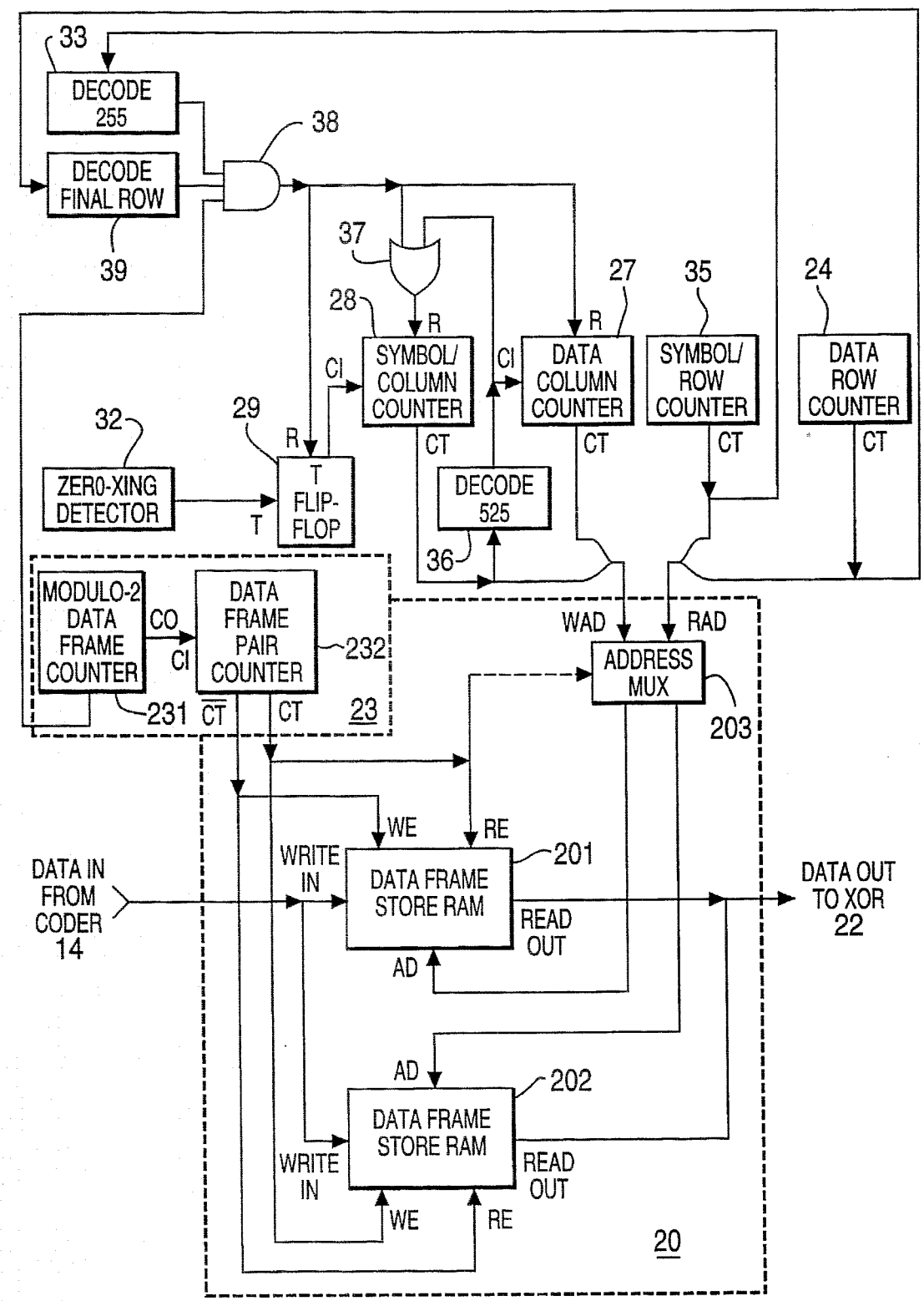
FIG. 3 is a schematic diagram of a rate buffer operated as an interleaver, which can be used in the portion of the FIG. 1 television transmitter shown in FIG. 2.

FIG. 3 shows specific connections for the pair 20 of digital framestores when they are to be operated as an interleaver for modified Reed-Solomon coding furnished from the error-correction coder 14. A data frame counter 23 includes a least-significant-bit counter stage 231 for generating MODULO-2 DATA FRAME COUNT and a next-to-least-significant-bit counter stage 232 for generating together with counter stage 231 MODULO-4 DATA FRAME COUNT. The next-to-least-significant-bit counter stage 232 controls the alternated writing and reading of two data framestore random access memories (RAMs) 201 and 202 that comprise the pair 20 of digital framestores. The RAMs 201 and 202 are written from the error-correction coder 14 at one-half PSK rate during alternate frame pair intervals, the address scanning being done by column and by symbols per column. Each of the RAMs 20 1 and 202 is read to the XOR gate 22 at PSK rate in each frame pair interval following a frame pair interval in which it is written, the address scanning being by row and by symbols per row. The "symbols" per row referred to here are PSK symbols or bits, not the 2N-bit symbols associated with the modified Reed-Solomon codes considered from a coding standpoint.

An address multiplexer 203 receives DATA ROW COUNT from the data row counter 24 and SYMBOL-PER-ROW COUNT from the symbol-per-row counter 35 as read addressing. The address multiplexer 203 receives DATA COLUMN COUNT from a data column counter 27 and SYMBOL-PER-COLUMN COUNT from a symbol-per-column counter 28 as write addressing. The zero-crossing detector 32 furnishes triggering pulses at PSK rate to a triggered flip-flop 29, which functions as a frequency divider for supplying alternate transitions of its output signal at one-half PSK rate to the symbol-per-column counter 28 as count input (CI). A decoder 36 decodes the SYMBOL-PER-COLUMN COUNT reaching full count (525 assuming symbol per column count starts at zero) to furnish a ONE as count input (CI) signal for the data column counter 27. The decoder 36 output signal is supplied as a first input signal to a two-input OR gate 37, which OR gate 37 responds to a ONE from the decoder 36 to furnish a ONE as reset (R) signal to the symbol-per-column counter 28. The trailing edge of each ONE pulse resets the SYMBOL-PER-COLUMN COUNT to its initial value, arithmetic one.

The second input signal to the OR gate 37 and the reset (R) signal to the data column counter 27 are furnished by the output response from a 3-input AND gate 38, which response when it is ONE resets both the SYMBOL-PER-COLUMN COUNT and the DATA COLUMN COUNT to their respective initial values. A decoder 39 supplies a logic ONE to a first input of the AND gate 38 when and only when the DATA ROW COUNT indicates that the final row of the data frame is reached; otherwise the decoder 39 supplies a logic ZERO as its output signal to the AND gate 38. The output signal from the final-symbol-of-the-data-row decoder 33 and the MODULO-2 DATA FRAME COUNT from the counter stage 231 in the data frame counter 23 are applied to the AND gate 38 as the other two of its three input signals. The AND gate 38 output response is a ONE only when the final symbol of the final data row is reached in the odd frame, just before the even frame is reached, during which even frame a selected one of the RAMs 201 and 202 is to be read to the framestore memory 21 data row by data row.

The more significant bit of the MODULO-4 DATA FRAME COUNT supplied from the counter stage 232 being a ONE conditions the address multiplexer 203 to select read addressing to the RAM 201 and to select write addressing to the RAM 202. The more significant bit of the MODULO-4 DATA FRAME COUNT supplied from the counter stage 232 being a ONE enables the RAM 201 to be read data row by data row to the first input of the XOR gate 22, and the one s complement of that count being a ZERO enables the RAM 202 to be written data column by data column from the error-correction coder 14.

The more significant bit of the MODULO-4 DATA FRAME COUNT supplied from the counter stage 232 being a ZERO conditions the address multiplexer 203 to select read addressing to the RAM 202 and to select write addressing to the RAM 201. The more significant bit of the MODULO-4 DATA FRAME COUNT supplied from the counter stage 232 being a ZERO enables the RAM 202 to be read data row by data row to the first input of the XOR gate 22, and the one's complement of that count being a ONE enables the RAM 201 to be written data column by data column from the error-correction coder 14.

Figure 4:
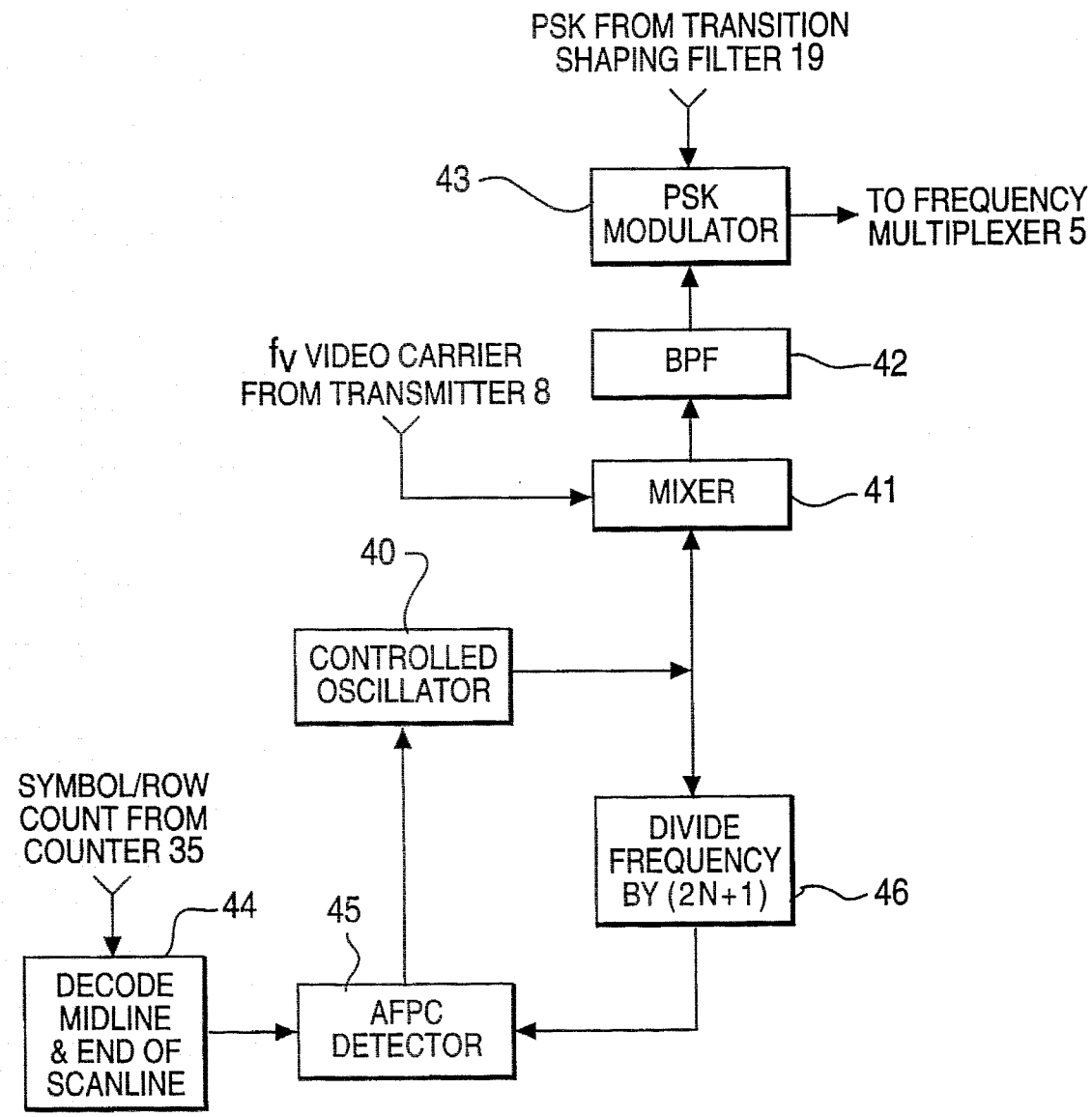
FIG. 4 is a schematic diagram of a digital data transmitter used in the FIG. 1 television transmitter to generate a data carrier which is transmitted through the same transmission channel as a television signal in which the data carrier is buried.

FIG. 4 shows in more detail the construction of the portion of the TV transmitter 1 used for generating the data subcarrier, which is offset in frequency from the video carrier by a frequency that is one-half an odd multiple of scan line frequency, so its energy tends to interleave with that of the video carrier modulation attributable to baseband luminance signal. A controlled oscillator 40 generates oscillations at the desired offset frequency, which are supplied as a first input signal to a multiplicative mixer 41 receiving as a second input signal the video carrier $f_v$ from the video transmitter 8. A bandpass filter 42 selects the desired data carrier and suppresses the image of the data carrier. The desired data carrier is supplied to a phase-shift-keying modulator 43, which modulates the data carrier in accordance with phase-shift keying signal received from the digital-to-analog converter 18 via the transition shaping filter 19, both shown in FIG. 1.

The bits of the SYMBOL-PER-ROW COUNT from the counter 35 of FIG. 2 are supplied to a decoder 44, which decodes two specific bit conditions (e.g., one-hundred-twenty-seven and two-hundred-fifty-five) to furnish pulses at twice horizontal scan line rate to an automatic frequency and phase control detector 45 that generates automatic frequency and phase control (AFPC) signal for the controlled oscillator 40. The oscillations from the controlled oscillator 40 are supplied to a frequency divider 46, which divides frequency by an odd factor 2N+1 where N is an integer. The frequency divider 46 can be constructed from a limiter, flip-flops operative as a counter and a decoder that decodes the occurrence of a count 2N to supply an output pulse and thereafter reset the count to zero. The output pulses from the frequency divider 46 are supplied to the detector 45 to be compared to the pulses furnished at twice horizontal scan line rate, thus to close an automatic frequency and phase control loop that adjusts the frequency of the oscillations from the controlled oscillator 40 to be $(2N+1)f_h/2$, where $f_h$ is the horizontal scan line frequency.

Figure 5:
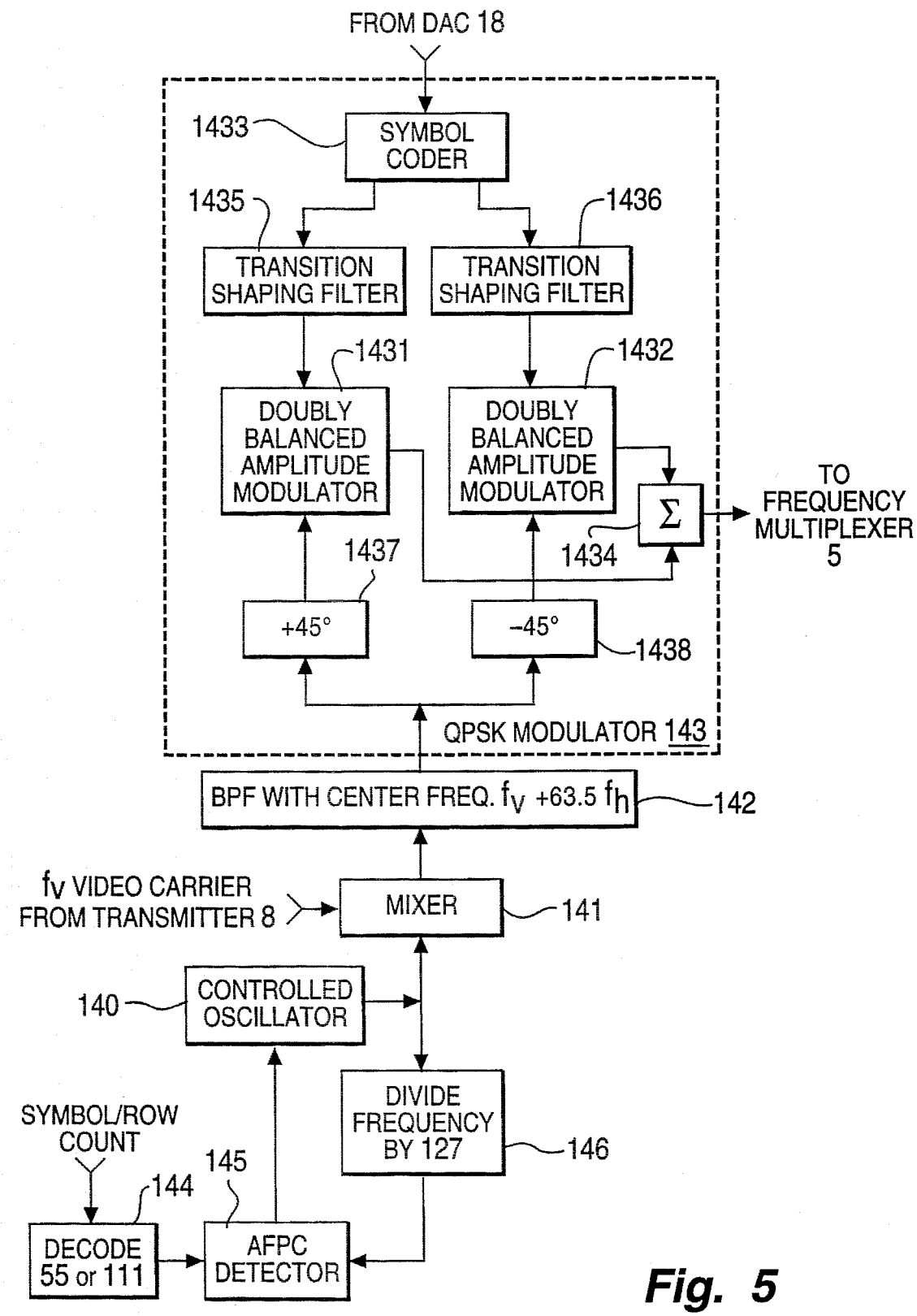
FIG. 5 shows further detail of the generation of a QPSK data carrier.

FIG. 5 shows further details of the generation of a QPSK data carrier. Supposing that the chroma signal bandwidth up to 500 kHz is not to be overlapped by data, the data carrier modulation might be fitted into a frequency range extending from about 750 kHz below video carrier to about 2.75 MHz above video carrier, for example, placing the data carrier at about 1 MHz above video carrier. If 2N+1 equals 127, the data carrier will be 999,128 Hz above video carrier. FIG. 5 shows a frequency divider 146 for dividing the frequency of oscillations from a controlled oscillator 140 by 127, thereafter to be compared in an AFPC detector 145 with pulses supplied at twice scan line rate. FIG. 5 shows the output signal from a mixer 141, which mixes a video carrier frequency $f_v$ with the 999,128 Hz oscillations from the controlled oscillator 140, being filtered with a bandpass filter 142 that selects $(f_v+63.5\ f_h)$ as the desired data carrier.

FIG. 5 uses a QPSK modulator 143 that has two balanced amplitude modulators 1431 and 1432, the output signal of each being balanced against both its data carrier and modulating signal. A symbol coder 1433 converts the output signal from the DAC 18 to in-phase and quadrature-phase modulating signals by parsing the bit stream into bit pairs and performing a serial-to-parallel conversion on the bits of each pair, per a procedure known in the art. The output signals of the balanced modulators 1431 and 1432 are summed by an analog adder 1434, and the resulting QPSK signal is supplied to the frequency multiplexer 5 of FIG. 1. The in-phase and quadrature-phase modulating signals are supplied to transition shaping filters 1435 and 1436, respectively, which supply their respective responses to the balanced modulators 1431 and 1432 as respective modulating signals. A pair of phase shift networks 1437 and 1438 respond to the response of the bandpass filter 142 to supply data carrier in respective phasings to the balanced modulators 1431 and 1432, which respective phasings are in quadrature with each other.

The number of symbols per row has to be adjusted to 112 to fit the ±1.75 Mhz or so bandwidth made available to the QPSK signal. Within the modified transmitter 1 this entails suitable changes in the controlled oscillator 31, the decoder 33 and the decoder 44. The decoder 44 takes a specific form 144 which detects midline and end-of-line SYMBOL-PER-ROW COUNTs of 55 and 111, respectively.

Figure 6:
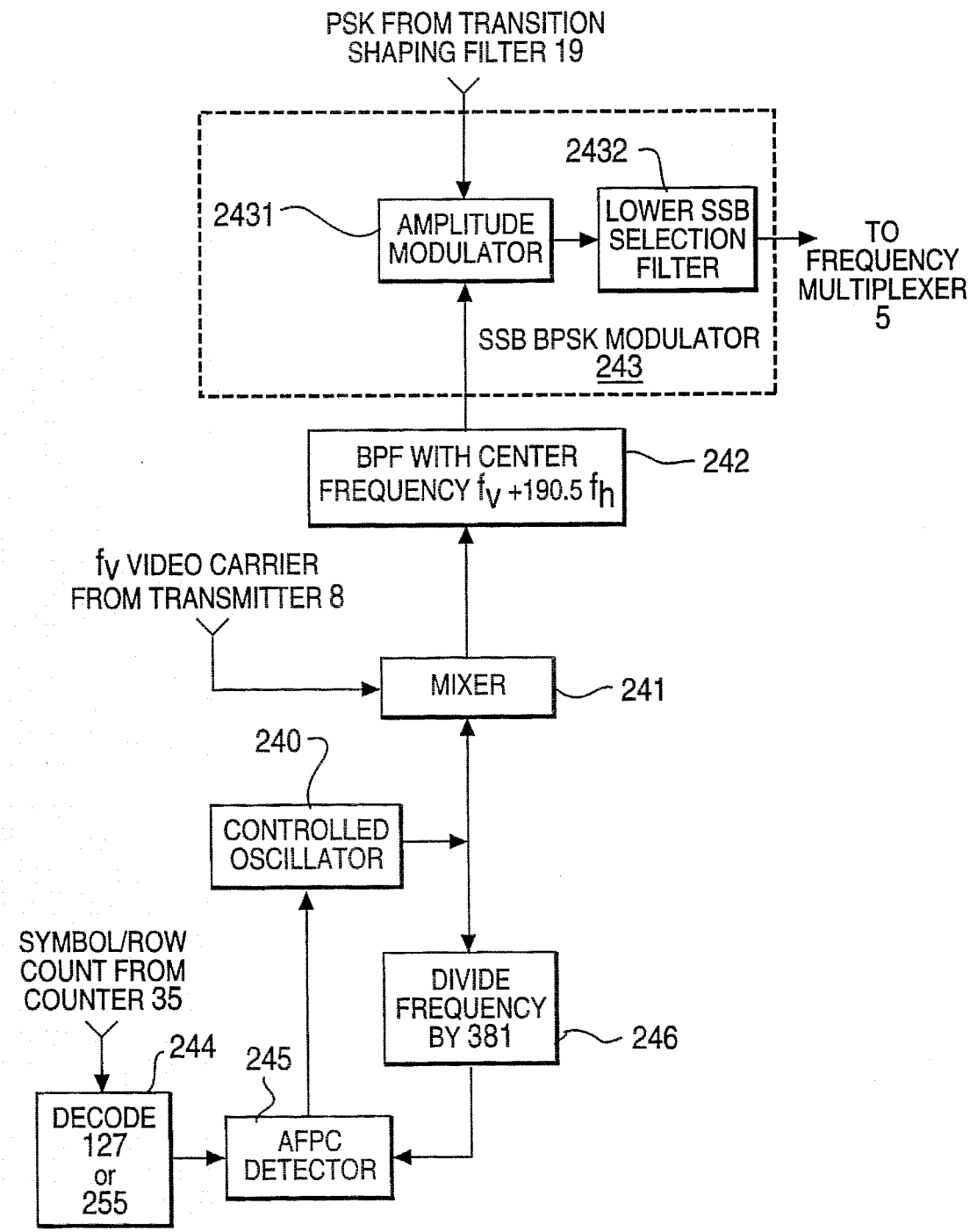
FIG. 6 shows further detail of the generation of a SSB BPSK data carrier, having its carrier in the single-sideband region of the video carrier.

FIG. 6 shows further detail of the generation of a SSB BPSK data carrier, having its carrier in the single-sideband region of the video carrier. Supposing that the chroma signal bandwidth up to 500 kHz is not to be overlapped by data, and the lower sideband of the data carrier is to be preserved, the data carrier could approach 3.00 MHz in frequency, as referred to baseband video signal. A data carrier of 381 $f_h/2$ above video carrier is at 2,997,377 Hz, as referred to baseband video signal. For 256 samples per row, modulation would extend 1,030,595 Hz below video carrier, which is possible because of the relatively low power of the digital carrier. FIG. 6 shows a frequency divider 246 for dividing the frequency of oscillations from a controlled oscillator 240 by 381, thereafter to be compared in an AFPC detector 245 with pulses supplied at twice scan line rate. FIG. 6 shows the output signal from a mixer 241, which mixes a video carrier frequency $f_v$ with the 2,997,377 Hz oscillations from the controlled oscillator 240, being filtered with a bandpass filter 242 that selects $(f_v+190.5\ f_h)$ as the desired data carrier.

FIG. 6 uses a BPSK modulator 243 that includes a single balanced amplitude modulator 2431 and a lower sideband selection filter 2432. The output signal of the balanced modulator 2431 is balanced against modulating signal and data carrier, and its lower sideband is selected by the filter 2432 as the modulated data carried supplied to the frequency multiplexer 5 in the FIG. 1 transmitter.

Figure 7:
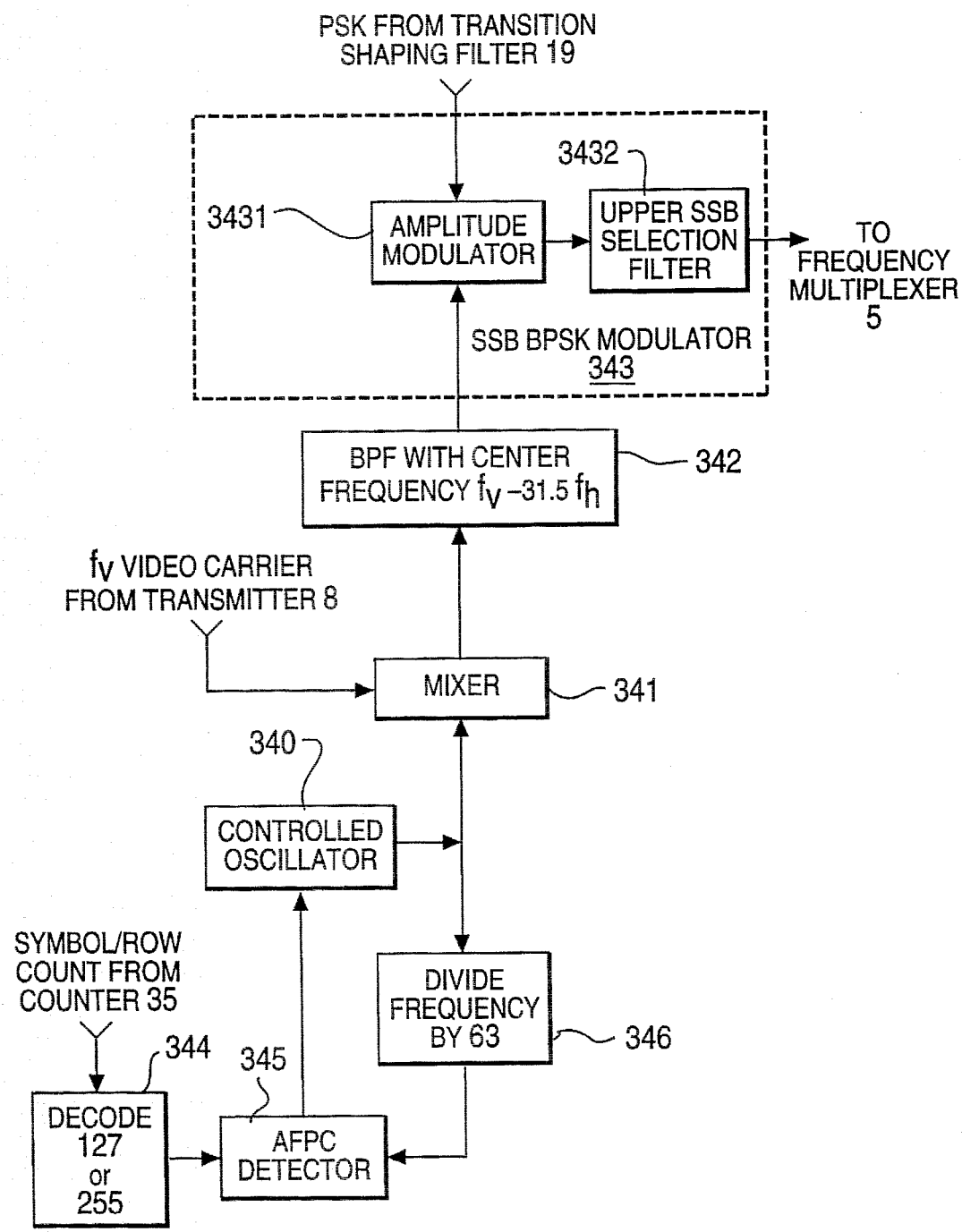
FIG. 7 shows further detail of the generation of a SSB BPSK data carrier, having its carrier in the vestigial-sideband region of the video carrier.

FIG. 7 shows further detail of the generation of a SSB BPSK data carrier, having its carrier in the vestigial-sideband region of the video carrier. A data carrier of 63 $f_h/2$ below video carrier is 999,125 Hz below video carrier. For 256 samples per row, modulation would extend 3,028,847 Hz above video carrier. FIG. 7 shows a frequency divider 346 for dividing the frequency of oscillations from a controlled oscillator 340 by 63, thereafter to be compared in an AFPC detector 345 with pulses supplied at twice scan line rate. FIG. 6 shows the output signal from a mixer 341, which mixes a video carrier frequency $f_v$ with the 2,997,377 Hz oscillations from the controlled oscillator 340, being filtered with a bandpass filter 342 that selects ($f_v$–31.5 $f_h$) as the desired data carrier.

FIG. 7 uses a BPSK modulator 343 that includes a single balanced amplitude modulator 3431 and an upper sideband selection filter 3432. The output signal of the balanced modulator 3431 is balanced against modulating signal and data carrier, and its upper sideband is selected by the filter 3432 as the modulated data carried supplied to the frequency multiplexer 5 in the FIG. 1 transmitter.

Figure 8:
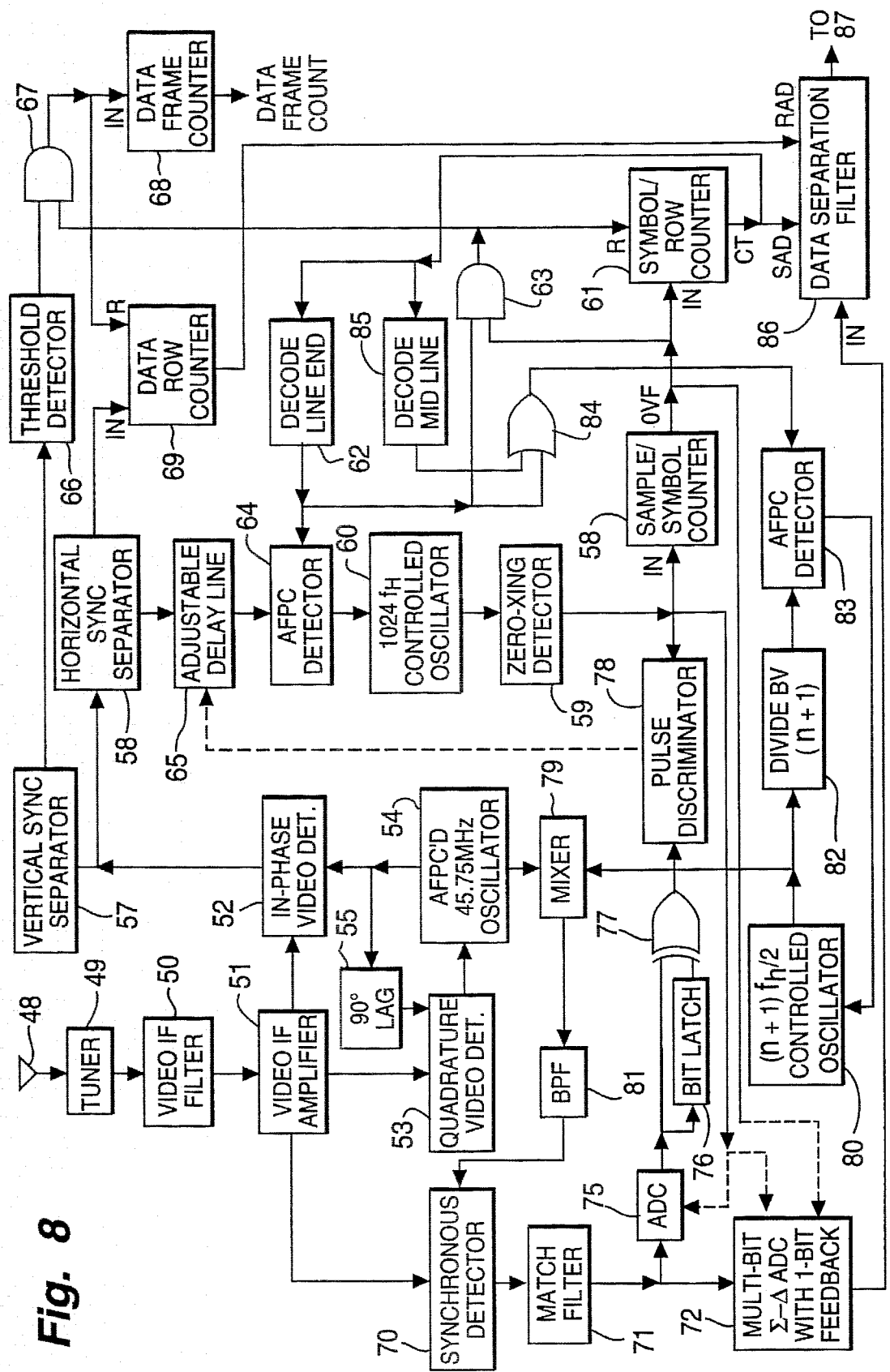
FIGS. 8 and 9 are schematic diagrams of initial and final portions, respectively, of a digital-signal receiver for receiving a television signal with a BPSK digital signal buried therewithin and extracting the buried digital signal.

FIG. 8 shows a portion 47 of a digital-signal receiver for extracting a buried digital signal from a television signal supplied, by way of example, from an antenna 48. A tuner 49 selects the television channel to be detected by the first detector therein, which first detector is a tunable downconverter, conventionally of superheterodyne type, for converting the selected television signal to a set of intermediate frequencies and an image set of frequencies. A video intermediate-frequency (IF) filter 50 selects the video intermediate frequencies for application as input signal to an intermediate-frequency (IF) amplifier 51 and rejects the image set of frequencies. Following the current custom a surface-acoustic-wave (SAW) filter can be used for the video IF filter 50 and to construct the video IF amplifier 51 within a monolithic integrated circuit (IC), as a multi-stage amplifier without interstage tuning. The video IF amplifier 51 supplies the amplified video IF signal to an in-phase synchronous video detector 52 and to a quadrature-phase synchronous video detector 53. An oscillator 54 oscillating with a nominal IF video carrier frequency of 45.75 MHz supplies its oscillations to the in-phase synchronous video detector 52 without phase shift and to the quadrature-phase synchronous video detector 53 with 90° lagging phase shift provided by a phase-shift network 55. The oscillator 54 has automatic frequency and phase control (AFPC) responding to the output signal of the quadrature-phase synchronous video detector 53. The synchronous video detectors 52 and 53 are customarily included together with the video IF amplifier 51 and portions of the oscillator 54 within the IC. In-phase modified composite video signal recovered by the in-phase synchronous video detector 52 is supplied to a horizontal sync separator 56 and to a vertical sync separator 57, which recover horizontal and vertical synchronizing pulses from the in-phase modified composite video signal, respectively.

The aspects of the digital-signal receiver thusfar considered are generally familiar to persons skilled in the art of TV receiver design, although the video IF filter 50 is likely to be somewhat different in bandwidth and center frequency, since it will not be called upon to pass modulated color subcarrier or FM sound in many designs. Generally, it is preferred to keep the data in a band overlapping primarily luminance signals, since the selective filtering against NTSC video signal is simplified in the data receiver facilitating the use of the same intermediate-frequency amplifier circuitry for both intermediate-frequency television signal and intermediate-frequency data signal.

Many variants of the digital-signal receiver thusfar considered are known to those skilled in the art. By way of specific example, the in-phase video detector 52 may be of exalted carrier type, rather than being of true synchronous type. In such case the quadrature-phase video detector 53, the controlled oscillator 54, and the phase-shift network 55 are dispensed with; and the controlled oscillator 54 is replaced by an injection-lock oscillator that provides the exalted carrier. The output signal of the video IF amplifier 51 is bandpass filtered to recover video carrier, which is injected into the injection-lock oscillator to control its frequency. The bandwidth of the intermediate-frequency selection filter 50 and video IF amplifier 51 may be made narrow enough to make the upper sideband of the video carrier just the image of its lower sideband; and an intermediate-frequency selection filter and IF amplifier for data separate from the intermediate-frequency selection filter 50 and video IF amplifier 51 can be used. A digital-signal receiver constructed in accordance with this specification utilizes an oscillator locked to intermediate-frequency video carrier as a basis for regenerating the intermediate-frequency data carrier. The injection-lock oscillator described in this paragraph can be used instead of the automatic frequency and phase controlled oscillator 54 as a basis for regenerating the intermediate-frequency data carrier.

In the portion 47 of the digital-signal receiver depicted in FIG. 8, a SAMPLE-PER-SYMBOL COUNT signal is generated by a sample-per-symbol counter 58 counting pulses generated by a zero-crossing detector 59 in response to sinusoidal oscillations received from a voltage-controlled oscillator 60. The sample-per-symbol counter 58 has four stages and supplies an overflow carry each sixteenth average-axis crossing of the oscillator 60 oscillations. A SYMBOL-PER-ROW COUNT signal is generated by a symbol-per-row counter 61 counting overflow carries from the sample-per-symbol counter 58. A decoder 62 decodes the SYMBOL-PER-ROW COUNT reaching a scan line end count to generate a pulse, which an AND gate 63 ANDs with the next overflow carry from the sample-per-symbol counter 58 to reset the symbol-per-row counter 61 to return the SYMBOL-PER-ROW COUNT to arithmetic zero. This manner of resetting the SYMBOL-PER-ROW COUNT to arithmetic zero is superfluous when the scan line end count decoded by the decoder 62 is one less than an integral power of two, such as 255, but works irrespective of what the full count of samples per line is (224, for example, when a QPSK data carrier is used).

The pulses generated by the decoder 62 are supplied to an AFPC detector 64 to be compared to the horizontal sync pulses H separated by the horizontal sync separator 56 and adjustably delayed for fractions of a symbol interval by a controlled delay line 65. The results of the comparison are lowpass filtered within the AFPC detector 64 to generate an automatic frequency and phase control (AFPC) voltage signal for application to the VCO 60. These arrangements control the frequency of the oscillations supplied from the line-locked VCO 60 to be 16×256=4096 times the horizontal scan line frequency $f_h$, or 64,447,545 Hz. The term "line-locked" used in reference to a controlled oscillator means that the frequency of its oscillations is maintained in constant ratio to the 15,734.264 Hz scan line frequency, which is customarily done by AFPC circuitry comparing the frequency of its oscillations as divided by a suitable factor to horizontal synchronizing pulses.

The vertical sync separator 57 supplies "lossy" integrated response to separated vertical sync pulses V to a threshold detector 66, the threshold voltage of which is chosen such that it is exceeded only when the vertical sync pulses are integrated over more than five-and-a-half scan lines and less than six-and-a-half scan lines. The threshold detector 66 output signal, which is a ONE only when its input signal exceeds its threshold voltage and is otherwise a ZERO, is supplied as a first input signal to a two-input AND gate 67. The AND gate 63 supplies its output signal to the AND gate 67 as a second input signal thereto. The AND gate 67 is responsive to the trailing edges of vertical pulses that occur at the beginning of the initial fields of composite video signal frames, to provide a respective DATA-FRAME-END pulse responsive to each of these edges, but is not responsive to the trailing edges of vertical pulses that occur between respective initial and final fields of frames. The DATA-FRAME-END pulses in the AND gate 67 response are supplied to a modulo-4 data frame counter 68 as count input (CI) signal, so as to advance a regenerated DATA FRAME COUNT signal.

The DATA-FRAME-END pulses in the AND gate 67 response are also applied as a reset (R) signal to a data row counter 69 to reset the DATA ROW COUNT regenerated as its output signal, which should then be 524, to arithmetic zero. The data row counter 69 is connected to count the horizontal sync pulses H supplied from the horizontal sync separator 56.

A digital-signal receiver having a portion 47 of the sort shown in FIG. 8 differs from those described in U.S. patent application Ser. No. 08/108,311; 08/141,070; 08/141,071; 08/179,586; 08/179,588; 08/179,616; 08/179,616 and 08/207,684 in that a synchronous detector 70 synchronously detects the data subcarrier in accordance with a data carrier regenerated at the data signal receiver. Ways to regenerate the data carrier are described further on in this specification. The output signal from the synchronous detector 70 is supplied to a match filter 71, which provides a peaking response that matches with the roll-off of the transition-shaping portion of the filter 19 in the transmitter to extend PSK bandwidth enough to reduce inter-symbol interference.

The response from the match filter 71 is applied as input signal to an analog-to-digital converter (ADC) 72, which is of a type capable of digitizing analog signal of either positive or negative polarity. More particularly, the ADC 72 is preferably a multi-bit sigma-delta converter with single-bit feedback, as described by T. C. Leslie and B. Singh in their paper "An Improved Sigma-Delta Modulator Architecture". A flash converter with 8-bit resolution (which is of modest price) samples the error signal in a second-order sigma-delta feedback loop, and single-bit feedback is used to minimize digital-to-analog conversion errors. The second-order sigma-delta feedback loop is unconditionally stable. The error signal is sampled at sixteen times the symbol rate of 256 times horizontal scan line rate $f_H$ for an 16:1 oversampling ratio, sampling each time a pulse is received over a line 73 from the zero-crossing detector 59. The zero-crossing detector 59 supplies such a pulse each time it detects a zero crossing of oscillations from the oscillator 60. The digital output of the flash converter is supplied to an FIR lowpass filter within the ΣΔ ADC 72, and the digital response of this filter is subsampled 16:1 by a subsampler sampling each time a pulse is received over a line 74 from the carry overflow of the sample-per-symbol counter 58. This decimation reduces the amount of storage capability required in the delay portions of the digital comb-filtering that follow the ΣΔ ADC 72 and will be described further on in this specification with reference to FIGS. 12, 13, 14, 15, 16, 17 and 18. Subsampling at symbol rate, with optimal phasing, is a form of synchronous symbol detection which suppresses response to those components of the composite video signal that exhibit change at symbol rate, but are in quadrature phasing with the sampling at symbol rate.

A single-bit ADC 75, sampling at eight times the symbol rate of 256 times horizontal scan line rate $f_h$ responsive to pulses supplied by the zero-crossing detector 59 on the line 73, responds to the match filter 71 response to supply a sign bit descriptive of the polarity of the match filter 71 response. That sign bit and that sign bit as delayed one sample in a bit latch 76 are supplied as respective inputs to an exclusive-OR gate 77. The XOR gate 77 detects match filter 71 response, supplying the results of this detection to a pulse phase discriminator 78. The pulse phase discriminator 78 selectively detects departures of the zero-crossings of the match filter 71 response, as detected by the XOR gate 77, from proper phasing respective to the zero-crossings of the oscillations of the controlled oscillator 60, as detected by the zero-crossing detector 59. The pulse phase discriminator 78 lowpass filters these selectively detected departures, as sampled and held, thereby to generate a control signal for adjusting the delay that the controlled delay line 65 provides for the horizontal sync pulses H applied to the AFPC detector 64. This selective detection by the pulse phase discriminator 78 can be done during portions of the vertical blanking interval when the response of the synchronous detector 70 to composite video signals is expected to be zero-valued. The phasing of the oversampling by the flash converter in the ΣΔ ADC 72 during its digitization of second-order sigma-delta error signal is accordingly adjusted for minimal inter-symbol interference.

FIG. 8 shows the data carrier applied to the synchronous detector 70 being generated by a mixer 79 that multiplicatively mixes the 45.75 Mhz oscillations from the controlled oscillator 54 with oscillations supplied from another controlled oscillator 80 at one-half an odd multiple of the scan line frequency. A bandpass filter 81 selects the data carrier for application to the synchronous detector 70 from the mixer 79 output signal. The oscillations from the controlled oscillator 80 are supplied to a frequency divider 82 that divides their frequency by a factor (2N+1) to be compared in an AFPC detector 83 with pulses at $f_H/2$ frequency. The AFPC detector 83 generates an AFPC signal applied to the controlled oscillator 80 for controlling the frequency and phase of its oscillations. The pulses at $f_H/2$ frequency are supplied from an OR gate 84 that ORs pulses received at ends of scan lines from the decoder 62 and pulses received at midpoints in the scan lines from a decoder 85. Both decoders 62 and 85 selectively respond to the SYMBOL-PER-ROW COUNT from the counter 61. The choice of the factor (2N+1) for the frequency divider 82 is the same as in the frequency divider 46 (e.g. 146, 246, 346) at the transmitter 1. The choice of the center frequency for the bandpass filter 81 is the same as in the bandpass filter 42 (e.g. 142, 242, 342) at the transmitter 1. This data carrier regeneration scheme works even if color subcarrier is unavailable. If color subcarrier is available to the digital-signal receiver, phase locking the controlled oscillator 80 to color subcarrier rather than to horizontal sync may be preferable, since a crystal controlled oscillator for regenerating the color subcarrier with high temporal accuracy is easily constructed.

The subsampled digital response from the ΣΔ ADC 72, which contains the synchronously detected data and interfering cross-products of composite video and data carrier, is supplied to a data separation filter 86 as input signal. Particular embodiments of the data separation filter 86 will be described further on in this specification with reference to FIGS. 12, 13, 14, 15, 16, 17 and 18 of the drawing. The data separation filter 86 includes a highpass frame-comb filter that separates the synchronously detected data and suppresses the interfering cross-products of composite video and data carrier. This highpass frame-comb filter includes a digital framestore that receives the DATA ROW COUNT from the data row counter 69 as row addressing and that receives the SYMBOL-PER-ROW COUNT from the symbol-per-row counter 61 as column addressing.

FIG. 9 also shows the data separation filter 86 receiving the subsampled digital response of the sigma-delta analog-to-digital converter 72 as input signal. Every other data frame the data separation filter 86 supplies valid separated data samples to ensuing symbol decision circuitry 87. These valid separated data samples are in multiple-level form, rather than in binary form. The symbol stream from the symbol decision circuitry 87 is supplied as input signal to a post-line-comb partial-response filter 88. The partial response filter 88 operates in the digital domain to undo what has been done to the digital information in the analog domain by the comb filtering in the data separation filter 86.

The symbol stream from the partial-response filter 88 is supplied as input signal to a rate buffer 89, which is conditioned by the least significant bit of the DATA FRAME COUNT to write different ones of two frame stores therewithin on alternate data frames and to read the one of these of two frame stores not selected for writing. Digital samples are supplied from the rate buffer 89 to an error-correction decoder 90. In preferred embodiments of the digital-signal receiver, designed to be used with a transmitter 1 using modified Reed-Solomon codes operating on columns of data transverse to horizontal scan lines, rather than on rows of data along horizontal scan lines, the rate buffer 89 is operated as a de-interleaver for the error-correction decoder 90. Decoder 90 converts its serial-bit digital input data to parallel-bit form and corrects the errors therein to provide corrected digital data, which are the output data of the digital-signal receiver.

Figure 10:
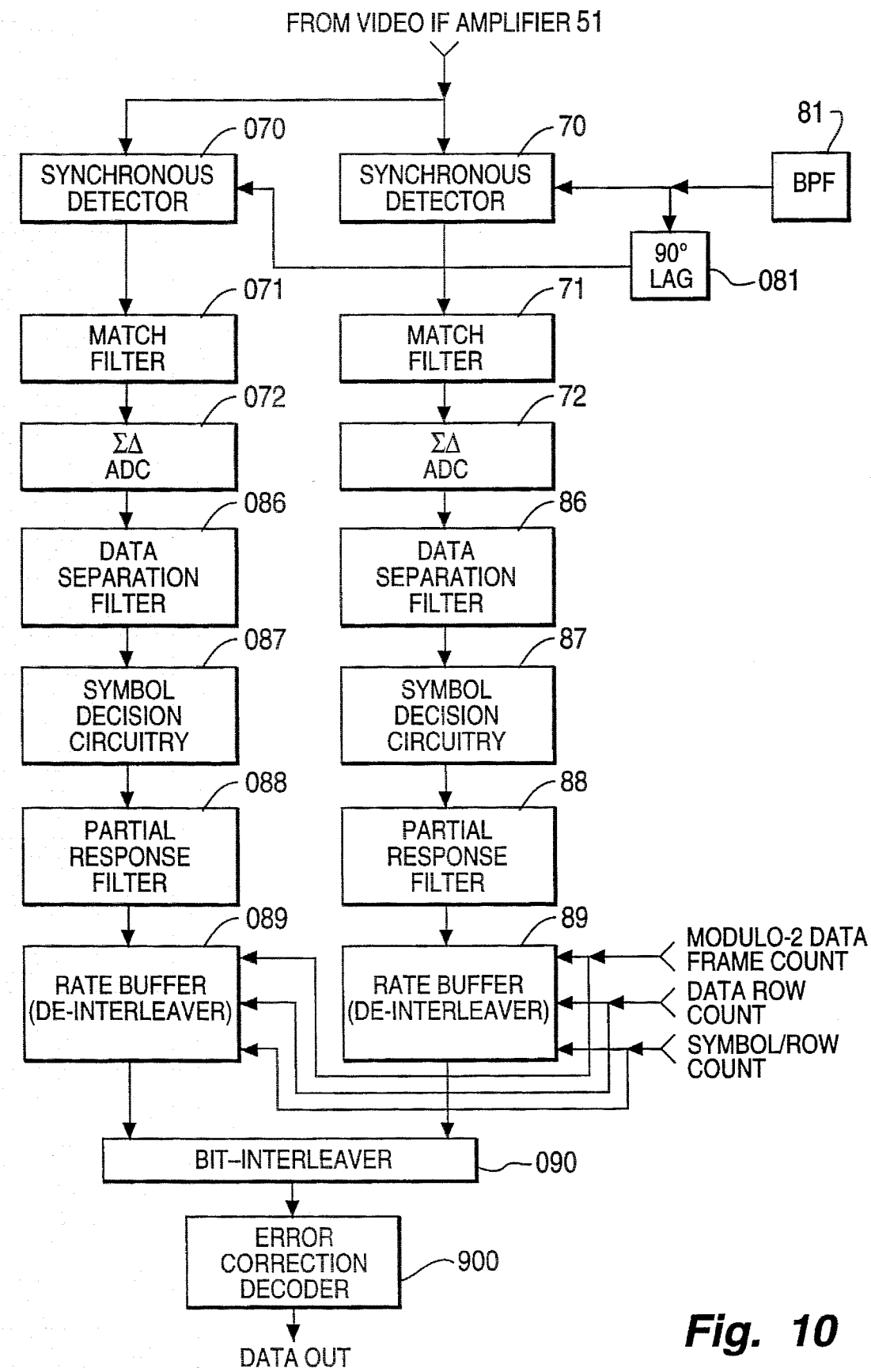
FIG. 10 is a schematic diagram of a final portion of a digital-signal receiver for receiving a television signal with a QPSK digital signal buried therewithin and extracting the buried digital signal, which digital-signal receiver has an initial portion substantially the same as shown in FIG. 10.

FIG. 10 shows how the final portion of the digital-signal receiver is modified when QPSK modulation of the data carrier as described in connection with FIGS. 3, 4 and 5 is used. The synchronous detector 70 receiving data carrier directly from the bandpass filter 81 is considered to be an in-phase synchronous detector for the QPSK data carrier, and elements 71, 72 and 86–89 connected thereafter correspond in connection and in operation to similarly numbered elements in FIG. 9. Another synchronous detector 070 receiving data carrier from the bandpass filter 81 after its having been phase shifted 90° in a phase shifter 081 is considered to be quadrature-phase synchronous detector for the QPSK data carrier, and elements 071, 072 and 086–089 connected after the synchronous detector 070 correspond to the elements 71, 72 and 86–89 in FIG. 9, both in connection and in operation. A bit interleaver 090 selects bits alternately from the output bit streams from the rate buffers 089 and 89 to form a combined bit stream supplied to the error correction decoder 900, which supplies error-corrected data as its output signal.

In a more sophisticated QPSK transmission scheme the pairs of anti-phase data frames generating the quadrature-phase AM sidebands of the data carrier are offset a data frame in phase from the pairs of anti-phase data frames generating the in-phase AM sidebands of the data carrier. This permits a single data separation filter that is used on a time-division-multiplex basis to replace the data separation filters 086 and 86. This single data separation filter supplies a continuous response to symbol decision circuitry that writes to a de-interleaver, which supplies the input signal for the error correction decoder 90. This provides a saving in hardware since the data separation filter and the symbol decision circuitry are no longer duplicated, but there is some complexity in providing for the time-division-multiplex switching. Offsetting the pairs of anti-phase data frames generating the quadrature-phase AM sidebands of the data carrier by a data frame in phase from the pairs of anti-phase data frames generating the in-phase AM sidebands of the data carrier also facilitates a digital-signal receiver being able to confirm for certain which set of sidebands is which.

Figure 11:
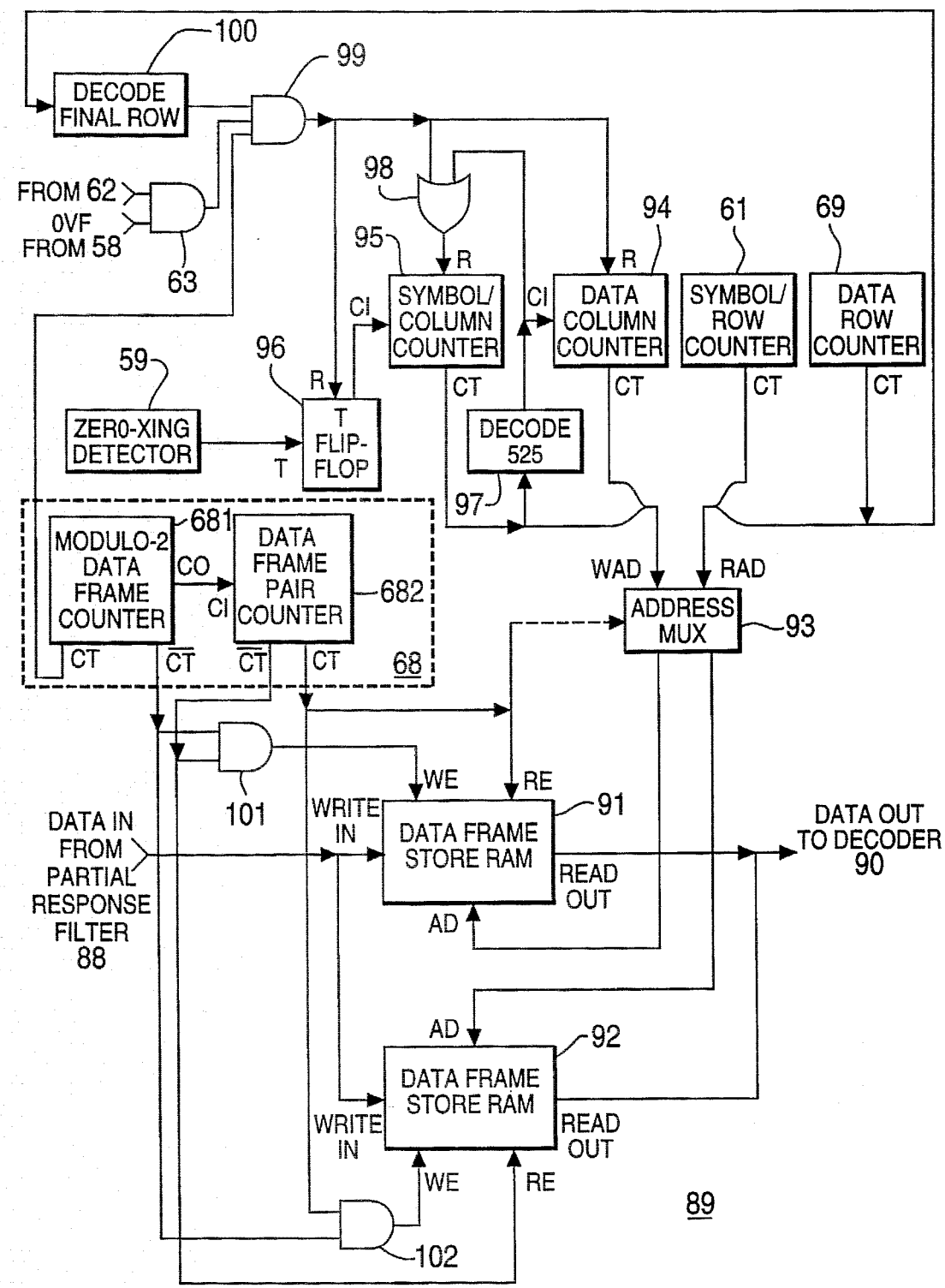
FIG. 11 is a schematic diagram of a rate buffer operated as a de-interleaver, which can be used in the final portion of the digital-signal receiver circuitry shown in FIG. 9.

FIG. 11 shows a form that the rate buffer 89 shown in FIGS. 9 and 10 can take when it is to be used as a de-interleaver for modified Reed-Solomon coding furnished from the partial-response filter 88. The rate buffer 089 shown in FIG. 10 can take similar form when it is to be used as a de-interleaver for modified Reed-Solomon coding furnished from the partial-response filter 088. The data frame counter 68 of FIG. 8 includes at least two counter stages 681 and 682 shown in FIG. 11. The counter stage 681 provides a MODULO-2 DATA FRAME COUNT and supplies a carry out (CO) signal to the counter stage 682 as its count input (CI) signal. The counter stage 682 is a data-frame-pair counter which together with the counter stage 681 provides a MODULO-4 DATA FRAME COUNT. The MODULO-4 DATA FRAME COUNT and the DATA ROW COUNT from the data row counter 69 can be used by the digital-signal receiver for synchronizing its data frame count with that of the transmitter 1. The ghost-cancellation reference (GCR) signal accompanying the NTSC television signal is cyclically supplied in the 19th lines of eight consecutive fields and can be decoded in the digital-signal receiver to determine correct phasing for the MODULO-4 DATA FRAME COUNT signal at the transmitter, as described in U.S. patent application Ser. No. 08/108,311. This type of frame synchronization is also described in U.S. Pat. No. 5,331,416 entitled METHODS FOR OPERATING GHOST-CANCELLATION CIRCUITRY FOR TV RECEIVER OR VIDEO RECORDER, which issued 19 Jul. 1994 to C. B. Patel and J. Yang.

The data frame pair counter stage 682 controls the alternated writing and reading of two data framestore random access memories 91 and 92 operated as a de-interleaver for error-correction coding. The RAMs 91 and 92 are written only during alternate even frames, the data for writing the RAMs 91 and 92 being supplied from the partial-response filter 88 at PSK rate, the address scanning being by row and by symbols per row. The "symbols" per row referred to here are PSK symbols or bits, not the 2 N-bit symbols associated with the modified Reed-Solomon codes considered from a coding standpoint. Each of the RAMs 91 and 92 is read to the framestore memory 862 at one-half PSK rate during alternate frame pair intervals, the address scanning being by column and by symbols per column.

An address multiplexer 93 receives DATA ROW COUNT from the data row counter 69 and SYMBOL-PER-ROW COUNT from the symbol-per-row counter 61 as write addressing. The address multiplexer 93 receives DATA COLUMN COUNT from a data column counter 94 and SYMBOL-PER-COLUMN COUNT from a symbol-per-column counter 95 as read addressing. The zero-crossing detector 59 furnishes triggering pulses at PSK rate to a triggered flip-flop 96, which functions as a frequency divider for supplying alternate transitions of its output signal at one-half PSK rate to the symbol-per-column counter 95 as count input (CI). A decoder 97 decodes the SYMBOL-PER-COLUMN COUNT reaching full count (525 assuming symbol per column count starts at zero) to furnish a ONE as count input (CI) signal for the data column counter 94. The decoder 97 output signal is supplied as a first input signal to a two-input OR gate 98, which OR gate 98 responds to a ONE from the decoder 97 to furnish a ONE as reset (R) signal to the symbol-per-column counter 95. The trailing edge of each ONE pulse resets the SYMBOL-PER-COLUMN COUNT to its initial value, arithmetic one.

The second input signal to the OR gate 98 and the reset (R) signal to the data column counter 94 are furnished by the output response from a 3-input AND gate 99, which response when it is ONE resets both the SYMBOL-PER-COLUMN COUNT and the DATA COLUMN COUNT to their respective initial values. A decoder 100 supplies a logic ONE to a first input of the AND gate 99 when and only when the DATA ROW COUNT indicates that the final row of the data frame is reached; otherwise the decoder 100 supplies a logic ZERO as its output signal to the AND gate 99. The output signal from the AND gate 63 at the very ends of horizontal scan lines and the MODULO-2 DATA FRAME COUNT from the data frame counter 70 are applied to the AND gate 98 as the other two of its three input signals. The AND gate 98 output response is a ONE only when the final symbol of the final data row is reached in the odd frame, just before the even frame is reached when a selected one of the RAMs 91 and 92 is to be written data row by data row by the output signal of the symbol decision circuitry 87 as filtered by the partial response filter 88.

Modulo-2 DATA FRAME PAIR COUNT from the data-frame-pair counter stage 682 being a ONE conditions the address multiplexer 93 to select read addressing to the RAM 91 and to select write addressing to the RAM 92. DATA FRAME PAIR COUNT from the data-frame-pair counter stage 682 being a ONE enables the RAM 91 to be read data column by data column to the error-correction decoder 90. A two-input AND gate 101 selectively supplies a ONE as write enable (WE) signal to the RAM 92, responsive to the one s complements of the MODULO-2 DATA FRAME COUNT and the DATA FRAME PAIR COUNT from the counter stages 681 and 682 both being ZEROs. This WE signal enables the RAM 92 to be written data row by data row by the output signal of the symbol decision circuitry 87 as filtered by the partial response filter 88.

Modulo-2 DATA FRAME PAIR COUNT from the data-frame-pair counter stage 682 being a ZERO conditions the address multiplexer 93 to select read addressing to the RAM 92 and to select write addressing to the RAM 91. DATA FRAME PAIR COUNT from the data-frame-pair counter stage 682 being a ZERO enables the RAM 92 to be read data column by data column to the error-correction decoder 90. A two-input AND gate 102 selectively supplies a ONE as write enable (WE) signal to the RAM 91, responsive to the one's complement of the DATA FRAME COUNT being a ZERO and the DATA FRAME PAIR COUNT from the data-frame-pair counter stage 682 being a ONE. This WE signal enables the RAM 91 to be written data row by data row by the output signal of the symbol decision circuitry 87 as filtered by the partial response filter 88

The rate buffering, done in the digital-signal receiver so as to fill the gap left when alternate frames of non-valid data arising from the frame-comb filtering of paired frames are discarded, can take place after the data separation filtering, but before the symbol decision circuitry. Rate buffering is preferably done after symbol decision, however, since then the framestore memory need only be one-bit deep, rather than many bits deep. Doing rate buffering together with de-interleaving before error-correction decoding is preferable, since it avoids the need for a separate framestore memory for rate buffering. Where rate buffering is done separately from de-interleaving, the rate buffering can be done with just one framestore memory, if it is a dual-ported RAM having a read-only port supplied by a shift register the serial stages of which can be loaded in parallel a row at a time from the RAM portion accessed through a read/write port.

Figure 12:
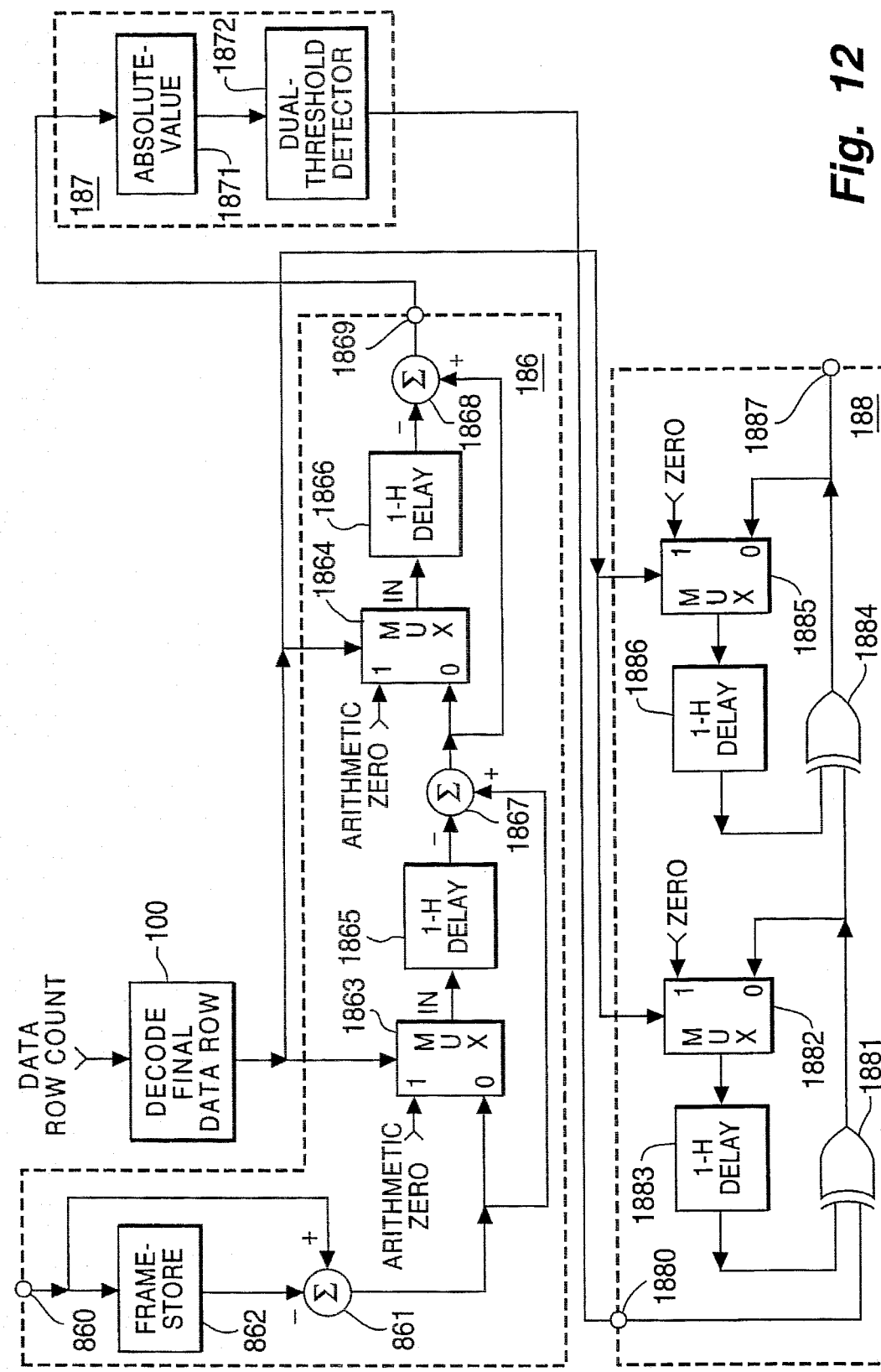

FIG. 12 shows a data separation filter 186, symbol decision circuitry 187, and a partial-response filter 188 that are specific circuits for the data separation filter 86, the decision circuitry 8[<b]old7 and the partial-response filter 88 shown generally in FIG. 9. An input terminal 1860 of the filter 186 receives digital samples from the $\Sigma\Delta$ ADC 72 for application to the minuend input of a digital subtractor 861 and to the input of a digital framestore 862. Digital samples read from the output of the digital framestore 862 are applied as the subtrahend input of the digital subtractor 861. The framestore 862 can be a RAM operated in a read-and-then-write-over mode, which RAM is addressed by a DATA ROW COUNT supplied from the counter 69 applied as row address and the SYMBOL-PER-ROW COUNT from the counter 61 applied as column address. The samples stored at each addressable storage location in the digital framestore 862 typically have at least twelve bits in them.

The subtractor 861 and the framestore 862 together form a highpass frame-comb filter, supplying at the output of the subtractor 861 a highpass frame-comb filter response to the digital samples received at the input terminal 1860 of the data separation filter 186. The highpass frame-comb filter response from the output of the subtractor 861, in which response luma components descriptive of static image are suppressed, is supplied to a highpass line-comb filter that comprises elements 1863–1868 and suppresses luma components descriptive of moving image in its response supplied at the output terminal 1869 of the data separation filter 186. Luma components are suppressed in the response supplied at the output terminal 1869, which is primarily constituted of highpass comb-filtered digital signal samples of 5-level form.

The decoder 100, which responds to DATA ROW COUNT, generates a logic ONE as output signal when the DATA ROW COUNT indicates that the final row of the data frame has been reached and generates a logic ZERO as output signal at all other times. The output signal of the decoder 100 is supplied as control signal to multiplexers 1863 and 1864, each of which multiplexers has a respective first input receptive of wired arithmetic zero and has a respective second input. The multiplexers 1863 and 1864 have respective outputs respectively connected to the respective inputs of 1-H digital delay lines 1865 and 1866. The output signal of a 1-H delay line reproduces the input signal applied thereto after a delay equal to the duration of a horizontal scanning line of the composite video signal (63.5 microseconds). The 1-H delay lines 1865 and 1866 can be constructed from respective RAMs addressed by the SYMBOL-PER-ROW COUNT (SAD) from the symbol counter 61 and operated in a read-then-write-over mode. The logic ONE furnished as output signal from the decoder 100 during the final row of each data frame conditions the multiplexers 1863 and 1864 to write a respective row of arithmetic-zero samples into each of the 1-H delay lines 1865 and 1866. Consequently, rows of arithmetic-zero samples are read from the 1-H delay lines 1865 and 1866 during the initial row of each data frame, which is done so that a post-line-comb partial-response filter portion of the partial-response filter 188 can be appropriately reset. This resetting will be described in more detail further on in this specification, with reference to FIG. 14 of the drawing.

A logic ZERO is furnished as output signal from the decoder 100 during normal operation of the highpass line-comb filter that comprises elements 1863–1868. Responsive to the logic ZERO supplied as a control signal from the decoder 100, the multiplexer 1863 replicates, in its output signal supplied to the input of the 1-H digital delay line 1865, the highpass frame-comb filter response applied to the second input of the multiplexer 1863 from the output of the subtractor 861. Responsive to the logic ZERO supplied as a control signal from the decoder 100, the multiplexer 1864 replicates, in its output signal supplied to the input of the 1-H digital delay line 1866 the difference output signal from a digital subtractor 1867. The subtractor 1867 combines the highpass frame-comb filter response and that response as delayed by the duration of one horizontal scan line; and a digital subtractor 1868 combines the difference output signal from the subtractor 1867 and that difference output signal as delayed by the duration of one horizontal scan line, thereby to generate at the output terminal 1869 a highpass line-comb filter response to the highpass frame-comb filter response from the output of the subtractor 861.

Figure 13:
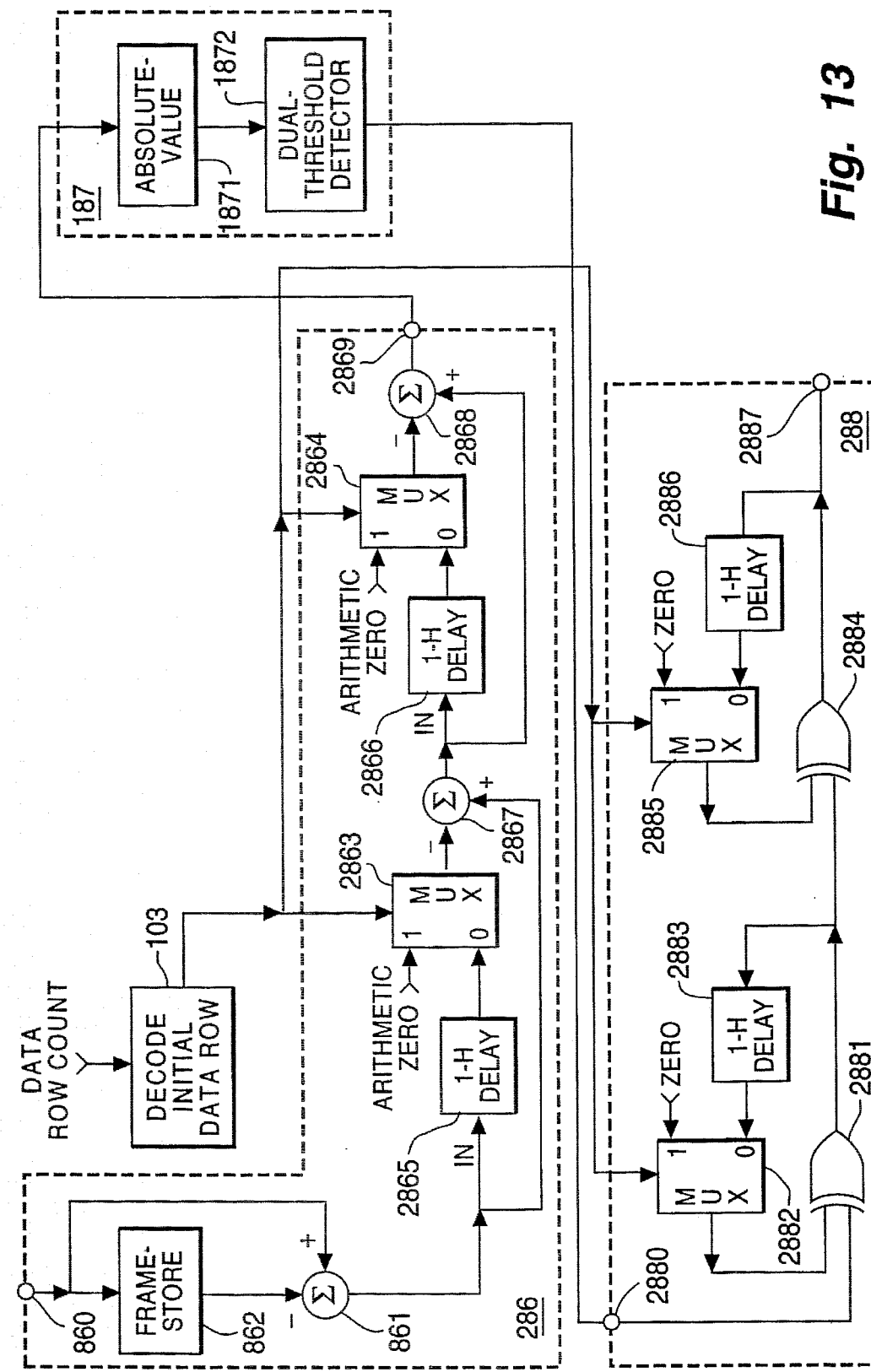

The comb filtering in the data separation filter 186 of FIG. 12 or in a data separation filter 187 of FIG. 13 converts the BPSK signal to 5-level digital information, rather than leaving it in binary form. Symbol decision circuitry 187 which provides for five comparator ranges respectively centered on −2, −1, 0, +1, and +2 is used to make symbol decisions on such 5-level digital information. Symbol decision circuitry 187 includes an absolute-value circuit 1871, which generates a rectified digital response to the output signal from the data separation filter 186 or 286. The rectified digital response of the absolute-value circuit 1871 is descriptive of ternary (or 3-level) keying signal superposed on a direct-voltage pedestal, rather than being descriptive of binary coding of keying signal, so this rectified digital response is supplied to a dual-threshold threshold detector 1872. The dual-threshold threshold detector 1872 receives the symbol stream from absolute-value circuit 1871 and makes a decision as to whether the symbol is most likely a ZERO, is most likely a ONE, or is most likely a TWO, TWOs being equated to ZEROs. The dual-threshold threshold detector 1872 typically contains two digital comparators (each arranged to operate as single-threshold detector, the second of these single-threshold detectors being operated at a threshold digital value twice as large as the threshold digital value the first of them is operated at) and some simple logic circuitry for deciding the identity of the symbol depending on the threshold detection results. If neither of the threshold digital values is exceeded, or if both of the threshold digital values is exceeded, the logic circuitry indicates that the symbol is most likely a ZERO. If only the lower threshold digital value is exceeded, the logic circuitry indicates that the symbol is most likely a ONE. The dual-threshold threshold detector 1872 is preferably of a type in which the digital values supplied to the comparators for determining the thresholds for threshold detection are automatically adjusted responsive to symbol strength. In such case, the dual-threshold threshold detector 1872 has associated circuitry for detecting the average level of the symbol stream supplied by absolute-value circuit 1871, or its average peak level, or both. There is circuitry for reckoning from each level detected the digital values supplied to the digital comparators to establish their respective thresholds for threshold detection. The detection procedures for determining symbol decision thresholds preferably are selectively implemented during the vertical blanking intervals, when the composite video signal contributes almost no energy to the signal detected by the synchronous detector 70.

The bit-serial signal from the dual-threshold threshold detector 1872 is applied via an input terminal 880 of the partial-response filter 188 to a first input of a two-input exclusive-OR (XOR) gate 1881. A two-input multiplexer 1882 has a first input to which a wired ZERO is applied, has a second input to which the response of the XOR gate 1881 is applied, and has an output connected to the input of a 1-H digital delay line 1883. The digital delay line 1883 supplies at its output connection to the second input of the XOR gate 1881 a response to the output signal from the multiplexer 1882 delayed by the duration of one horizontal scan line. The elements 1881, 1882 and 1883 provide an initial section of a post-line-comb partial-response filter, shown in FIG. 14 as having a final section including elements 1884, 1885 and 1888. The two-input exclusive-OR gate 1884 has a first input to which the output of XOR gate 1881 is connected for applying the response of the initial section of the pre-line-comb partial-response filtering. A two-input multiplexer 1885i has a first input to which a wired ZERO is applied, has a second input to which the response of the XOR gate 1884 is applied, and has an output connected to the input of a 1-H digital delay line 1886. The digital delay line 1886 supplies at its output connection to the second input of the XOR gate 1883 a response to the output signal from the multiplexer 1885 delayed by the duration of one horizontal scan line. Each of the multiplexers 1882 and 1885 receives the output signal from the decoder 100 as its control signal.

The output signal of the decoder 100 is a ONE only during the final row of each data frame, conditioning the multiplexers 1863 and 1864 to load arithmetic-zero samples into the 1-H digital delay lines 865 and 866 in the data separation filter 186, and conditioning the multiplexers 1882 and 1885 in the partial-response filter 188 to load logic-ZERO samples into the 1-H digital delay lines 1883 and 1886. These procedures allow the contents of the 1-H digital delay lines 1883 and 1886 in the post-line-comb partial-response filter to be periodically initialized, in synchronization with the initialization of the contents of the 1-H digital delay lines 1865 and 1866 in the highpass line-comb filter portions of the data separation filter 186. Since this periodic initialization is done during the vertical blanking interval, to reduce the remnants of the NTSC video signal that act as a jamming signal. The data frames begin and end during scan lines when color burst is not transmitted, so only synchronizing and equalizing pulses remain as jamming signal.

The response of the final section of the post-line-comb partial-response filter comprising the elements 1881–1886 appears at the output of the XOR gate 1884 and is applied to the output terminal 1887 of the partial response filter 188. Because of the data frames being repeated, there is no need for a post-frame-comb partial response filter.

FIG. 13 shows a data separation filter 286, the symbol decision circuitry 187, and a partial-response filter 288 that are specific circuits for the data separation filter 86, the decision circuitry 87 and the partial-response filter 88 shown generally in FIG. 9. Two-input multiplexers 2863, 2864, 2882 and 2885 are positioned for affecting reading from the 1-H delays 2865, 2866, 2883 and 2886 in the data separation filter 286 and the partial-response filter 288, rather than their writing. This differs from the data separation filter 186 and the partial-response filter 188 of FIG. 12 in which the two-input multiplexers 1863, 1864, 1882 and 1885 are positioned for affecting writing to the 1-H delays 1865, 1866, 1883 and 1886, rather than their reading.

In the FIG. 13 data separation filter 286 the first inputs of the multiplexers 2863 and 2864 receive respective wired arithmetic-zero input signals, which those multiplexers are conditioned to replicate at their respective outputs responsive to a decoder 103 supplying them a logic ONE as a control signal. In the FIG. 13 partial-response filter 288 the first inputs of the multiplexers 2882 and 2885 receive respective wired logic-ZERO input signals, which those multiplexers are conditioned to replicate at their respective outputs responsive to a decoder 103 supplying them a logic ONE as a control signal. The decoder 103 generates a logic ONE when and only when the DATA ROW COUNT signal is indicative of the initial row of a data frame being reached. Otherwise, the decoder 103 generates a logic ZERO as a control signal for the multiplexers 2863, 2864, 2882 and 2885, conditioning them to replicate at their respective outputs the signals applied to their respective second inputs. The 1-H delays 2865, 2866, 2883 and 2886 have their outputs connected to the second inputs of the multiplexers 2863, 2864, 2882 and 2885, respectively, and respond after a delay of duration equal to that of a horizontal scan line to signals applied to their respective inputs from the respective outputs of the subtractor 861, the subtractor 2867, the XOR gate 2881 and the XOR gate 2884, respectively. The outputs of the multiplexers 2863, 2864, 2882 and 2885 connect to the minuend input of the subtractor 2867, the minuend input of the subtractor 2868, the second input of the XOR gate 2881, and the second input of the XOR gate 2884, respectively.

Figure 14:
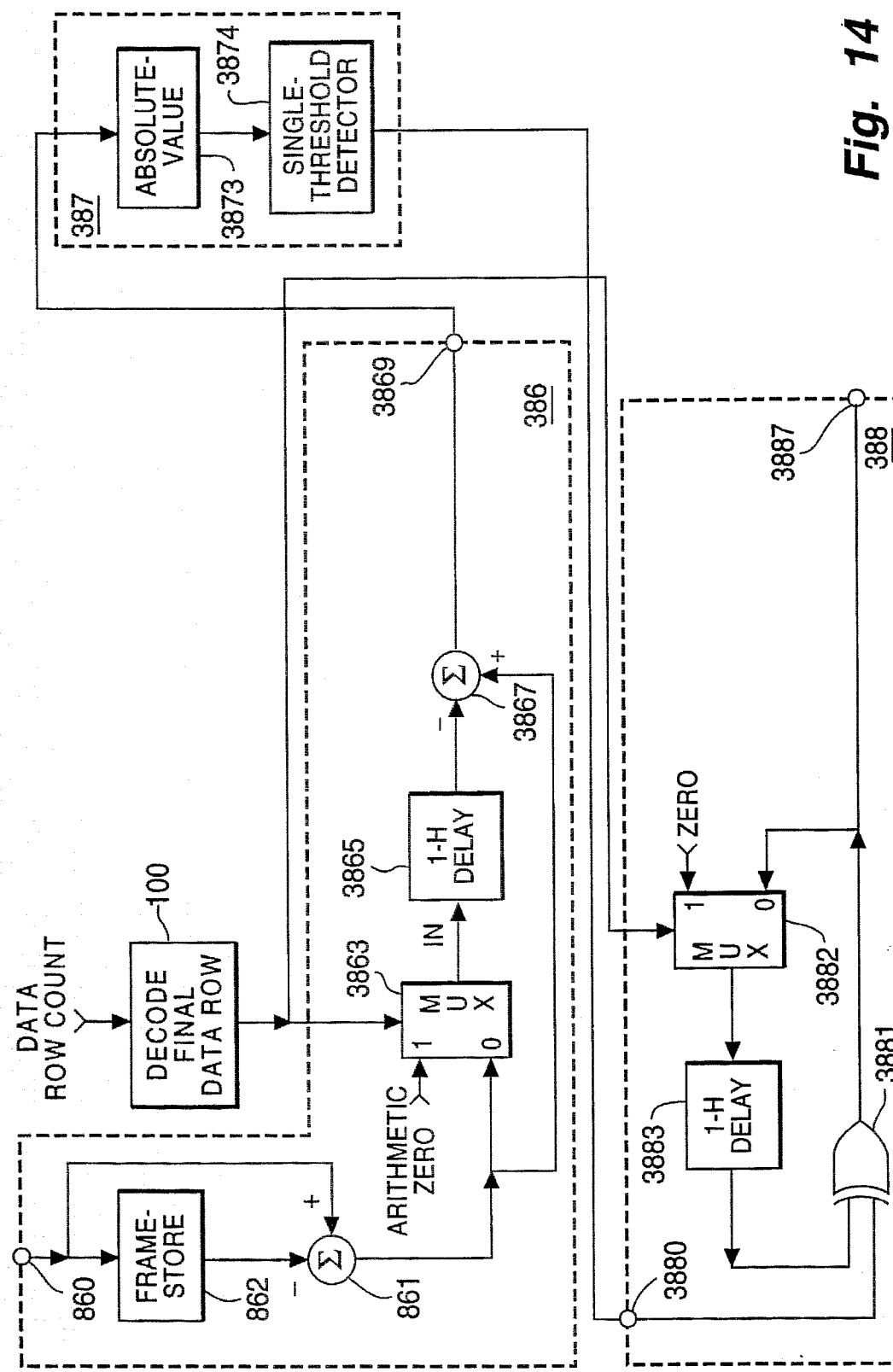

FIG. 14 shows a data separation filter 386, symbol decision circuitry 387, and a partial-response filter 388 that are specific circuits for the data separation filter 86, the decision circuitry 87 and the partial-response filter 88 shown generally in FIG. 9. The FIG. 14 circuitry differs from that of FIG. 12 in that the line-comb filtering in the data separation filter 386 is done over two horizontal scan lines, rather than over three as in the data separation filter 186. Accordingly, there are no elements corresponding to the elements 1864, 1866 and 1868 in the data separation filter 186, and the difference output signal from the digital subtractor 3867 is applied to the output terminal 3869 of the data separation filter 386. The digital signal in this output signal is ternary or three-level in nature, rather than five-level in nature.

Therefore, an absolute-value circuit 3871 in the symbol decision circuitry 387 of FIG. 14 supplies absolute-value response to the decision circuitry 387 input signal to a single-threshold threshold detector 3872, which makes a decision as to whether each symbol is most likely a ZERO or is most likely a ONE. The single-threshold threshold detector 3872 typically contains one digital comparator for comparing the output signal from the absolute-value circuit 3871 against a single threshold digital value. If the threshold digital value is not exceeded, the threshold detector 3872 indicates that the symbol is most likely a ZERO. If the threshold digital value is exceeded, the threshold detector 3872 indicates that the symbol is most likely a ONE. The threshold detector 3872 is preferably of a type in which the digital value supplied to the comparator for determining the threshold level for threshold detection is automatically adjusted responsive to symbol strength. In such case, the threshold detector 3872 has associated circuitry for detecting the average level of the symbol stream supplied by the absolute-value circuit 3871, or its average peak level, or both. There is circuitry for reckoning from each level detected the digital value supplied to the digital comparator to establish its threshold level for threshold detection. The detection procedure for determining the symbol decision threshold preferably is selectively implemented during the vertical blanking intervals, when the composite video signal contributes least energy to the signal detected by the synchronous detector 70.

The FIG. 14 partial-response filter 388 has no elements corresponding to the elements 1884 through 1886 of the FIG. 12 partial-response filter 188, and the output connection of the XOR gate 3881 is to the output terminal 3887 of the partial-response filter 388.

Figure 15:
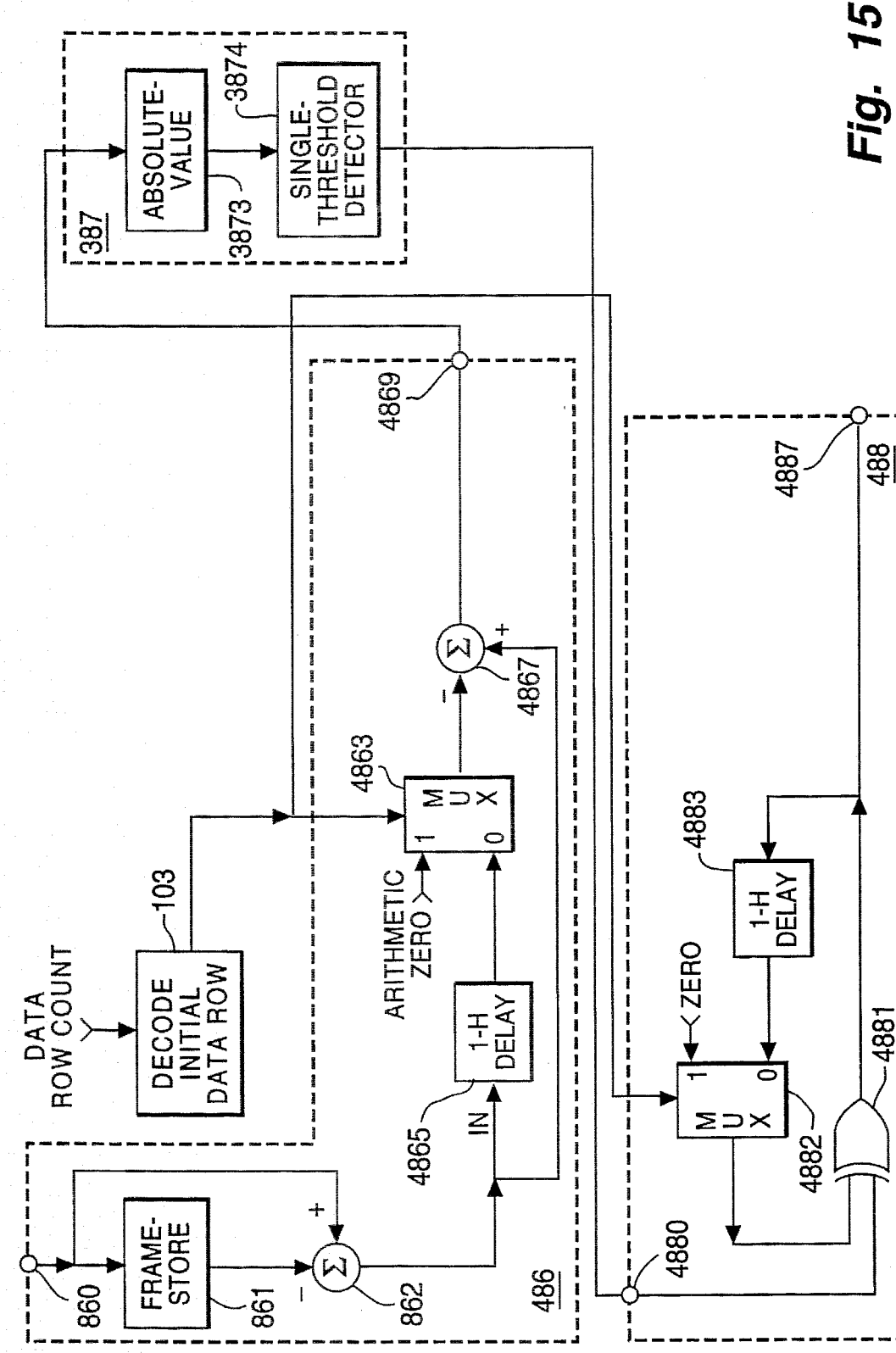

FIG. 15 shows a data separation filter 486, the symbol decision circuitry 387, and a partial-response filter 488 that are specific circuits for the data separation filter 86, the decision circuitry 87 and the partial-response filter 88 shown generally in FIG. 9. The FIG. 15 circuitry differs from that of FIG. 13 in that the line-comb filtering in the data separation filter 486 is done over two horizontal scan lines, rather than over three as in the data separation filter 286. Accordingly, there are no elements corresponding to the elements 2864, 2866 and 2868 in the FIG. 15 data separation filter 286, and the difference output signal from the digital subtractor 4867 is applied to the output terminal 4869 of the data separation filter 486. The digital signal in this output signal is ternary or three-level in nature, rather than five-level in nature, so the decision circuitry 387 is used. The partial-response filter 488 has no elements corresponding to the elements 2884, 2885 and 2886 of the FIG. 13 partial-response filter 288; and the output connection of the XOR gate 4881 is to the output terminal 4887 of the partial-response filter 488.

FIG. 16 shows the portion of the digital-signal receiver comprising the data separation filter 86, the symbol decision circuitry 87 and the partial-response filter 88 being constructed so as to perform adaptive line-comb filtering. The FIG. 16 circuitry performs line-comb filtering in the data separation filter 586 over three horizontal scan lines, similar to the FIG. 13 circuitry, and over two horizontal scan lines, similar to the FIG. 15 circuitry. The FIG. 16 circuitry determines the one of the line-comb filtering responses that is least susceptible of being jammed by remnants of NTSC composite video signal in the synchronous detector 70 response and, based on that determination, selects the data symbol recovered from that line-comb filtering response for application to the rate buffer 89. Line-comb filtering over three horizontal scan lines results in lower-amplitude immediate response to a transition in the direction of vertical scan, but line-comb filtering over two horizontal scan lines results in lower-amplitude delayed response to such a transition.

In the FIG. 16 circuitry, as in the circuitry of FIGS. 12, 13, 14 and 15, an input terminal 860 of the data separation filter 586 receives digital samples from the ΣΔ ADC 72 for application to the minuend input of a digital subtractor 861 and to the input of a digital framestore 862. Digital samples read from the output of the digital framestore 862 are applied as the subtrahend input of the digital subtractor 861. The framestore 862 can be a RAM operated in a read-and-then-write-over mode, which RAM is addressed by a DATA ROW COUNT supplied from the counter 69 applied as row address and the SYMBOL-PER-ROW COUNT from the counter 61 applied as column address. The subtractor 861 and the framestore 862 together form a highpass frame-comb filter, supplying at the output of the subtractor 861 a highpass frame-comb filter response to the digital samples received at the input terminal 860 of the data separation filter 86. The highpass frame-comb filter response from the output of the subtractor 861, in which response luma components descriptive of static image are suppressed, is supplied to a highpass line-comb filter that suppresses luma components descriptive of moving image in its response supplied at the output terminal 5869 of the data separation filter 586. Luma components are suppressed in the response supplied at the output terminal 5869, which is primarily constituted of highpass comb-filtered digital signal samples of 5-level form.

The structure of the highpass line-comb filter shown in FIG. 16 differs somewhat from that shown in FIG. 13, but is electrically equivalent insofar as generating highpass line-comb filter response at terminal 5869 is concerned. In FIG. 16 the write input to the 1-H delay line 5866 is taken from the subtrahend input to the digital subtractor 5867, rather than from its difference output as in FIG. 13. In FIG. 16 the subtrahend input to the digital subtractor 5868 is taken from the difference output of a digital subtractor 5860, rather from the output of the multiplexer 5864 as in FIG. 13. The digital subtractor 5860 of FIG. 16 has the subtrahend input to the subtractor 5867 connected to its minuend input and has the output of the multiplexer 5864 connected to its subtrahend input. In FIG. 16 the difference output from the subtractor 5867 is supplied to another output terminal 5861 of the data separation filter 586, as an output signal corresponding to that supplied from the output terminal 2869 of the FIG. 13 data separation filter 286. In the FIG. 16 data separation filter 586 yet another output terminal 5862 thereof is supplied the difference output from the subtractor 5860.

The FIG. 11 symbol decision circuitry 587 includes the absolute-value circuits 5871 and 5873 with respective input connections from the output terminals 5869 and 5861, respectively, of the data separation filter 586. The signal at the output terminal 869 includes a 5-level digital signal as a component thereof. The rectified digital response of the absolute-value circuit 5871 to this signal is descriptive of ternary (or 3-level) keying signal superposed on a direct-voltage pedestal. This rectified digital response is supplied to the dual-threshold threshold detector 5872, which makes a decision as to whether each successive symbol is most likely a ZERO, is most likely a ONE, or is most likely a TWO, TWOs being equated to ZEROs. The signal at the output terminal 5861 includes a ternary (or 3-level) digital signal as a component thereof. The rectified digital response of the absolute-value circuit 5873 to this signal is descriptive of binary keying signal superposed on a direct-voltage pedestal and is supplied to the single-threshold detector 5874, which makes an alternative decision as to whether each successive symbol is most likely a ZERO or is most likely a ONE.

The FIG. 16 symbol decision circuitry 587 includes a further absolute-value circuit 5875 with an input connection from the output terminal 5862 of the data separation filter 586. The output signals of the absolute-value circuits 5873 and 5875 are compared by a digital comparator 5876 that generates a logic ONE when and only when the absolute-value response of circuit 5873 exceeds the absolute-value response of circuit 5875. This logic ONE indicates that the symbol decision based on three-line line-comb filter response at terminal 5869 is probably better than the symbol decision based on two-line line-comb filter response at terminal 5861.

In practice, one may prefer not to switch to the three-line line-comb filter unless a string of mostly ONEs is generated by the comparator 5876, which provides a more reliable indication that it is an edge of the composite video signal that is responsible for the digital comparator 5876 output signal being a ONE. This mode of operation can be secured by applying the comparator 5876 output signal as up/down control signal to an up/down counter counting at PSK symbol rate. The count from this up/down counter is then threshold detected by another digital comparator that generates control signal for the multiplexer 58812. This other digital comparator generates a ONE as control signal for the multiplexer 58812 only when a string of mostly ONEs occurs that is longer than the threshold value the up/down counter count is compared against.

The FIG. 16 partial-response filter 588 includes elements 5880 through 5886 corresponding in function to similarly numbered elements in the FIG. 13 partial-response filter 288 and in their connection from the dual-threshold threshold detector 5872. The FIG. 16 partial-response filter 588 further includes another input terminal 5888, an exclusive-OR gate 5889, a two-input multiplexer 58810 and a 1-H digital delay line 58811 corresponding in function to the input terminal 4880, the exclusive-OR gate 4881, the two-input multiplexer 4882 and the 1-H digital delay line 4883 in the FIG. 15 partial-response filter 488. The FIG. 16 connection from the output of the single-threshold detector 5874 to the first input of the exclusive-OR gate 5889 is analogous to the FIG. 15 connection from the output of the single-threshold detector 4874 to the first input of the exclusive-OR gate 4881. The output terminal 4887 of the FIG. 16 partial-response filter 588 connects from the output of a two-input multiplexer 58812, the first input of which connects from the output of the XOR gate 5884 and the second input of which connects from the output of the XOR gate 5889. The signal that the XOR gate 5884 supplies to the first input of the multiplexer 58812 in FIG. 16 corresponds to the signal that the XOR gate 2884 supplies to the output terminal 2887 in FIG. 13, and the signal that the XOR gate 5889 supplies to the second input of the multiplexer 58812 in FIG. 16 corresponds to the signal that the XOR gate 4884 supplies to the output terminal 4887 in FIG. 15. The output signal of the digital comparator 5876 is a control signal for the multiplexer 58812. The generation of a logic ONE by the digital comparator 5876 conditions the multiplexer 58812 to replicate at its output connection to the output terminal 5887 the signal that the XOR gate 5884 supplies to the first input of the multiplexer 58812. The generation of a logic ZERO by the digital comparator 5876 conditions the multiplexer 58812 to replicate at its output connection to the output terminal 5887 the signal that the XOR gate 5889 supplies to the second input of the multiplexer 58812.

In FIG. 16 the first inputs of the multiplexers 5863 and 5864 receive respective wired arithmetic-zero input signals, which those multiplexers are conditioned to replicate at their respective outputs responsive to a decoder 103 supplying them a logic ONE as a control signal. In FIG. 16 the first inputs of the multiplexers 5882, 5885 and 58810 receive respective wired logic-ZERO input signals, which those multiplexers are conditioned to replicate at their respective outputs responsive to a decoder 103 supplying them a logic ONE as a control signal. The decoder 103 generates a logic ONE when and only when the DATA ROW COUNT signal is indicative of the initial row of a data frame being reached. Otherwise, the decoder 103 generates a logic ZERO as a control signal for the multiplexers 5863, 5864, 5882, 5885 and 58810, conditioning them to replicate at their respective outputs the signals applied to their respective second inputs.

FIG. 17 shows a variant of the FIG. 16 circuitry, which has the same type of symbol decision circuitry 587. The data separation filter 686 and the partial-response filter 688 in FIG. 13 differ from the data separation filter 586 and the partial-response filter 588 in FIG. 16, however, in that the two-input multiplexers 6863, 6864, 6882, 6885 and 68810 are positioned for affecting writing to the 1-H delays 6865, 6866, 6883, 6886 and 68811, rather than affecting their reading.

The first inputs of the multiplexers 6863 and 6864 receive respective wired arithmetic-zero input signals, which those multiplexers are conditioned to replicate at their respective outputs responsive to a decoder 100 supplying them a logic ONE as a control signal. The first inputs of the multiplexers 6882, 6885 and 68810 in the FIG. 17 partial-response filter 688 receive respective wired logic-ZERO input signals, which those multiplexers are conditioned to replicate at their respective outputs responsive to the decoder 100 supplying them a logic ONE as a control signal indicative of the final row of a data frame being reached. Otherwise, the decoder 100 generates a logic ZERO as a control signal for the multiplexers 863, 864, 882, 885 and 8810, conditioning them to replicate at their respective outputs the signals applied to their respective second inputs.

FIG. 18 shows modifications that can be made to any of the digital-signal receivers thusfar described. These modifications are made to reduce the likelihood of error owing to frame-to-frame changes between the paired frames in which data is transmitted in one logic sense during the earlier frame and is re-transmitted in opposite logic sense during the later frame. When substantial frame-to-frame changes between the paired frames in which data is transmitted in one logic sense during the earlier frame and is re-transmitted in opposite logic sense during the later frame are detected, if the frame-to-frame changes between the earlier frame and the immediately preceding frame are smaller, highpass frame-comb filter response to the earlier frame and the immediately preceding frame provides a better basis for subsequent highpass line-comb filtering and symbol decision.

In FIG. 18 the input terminal 860 receives digital samples from the ΣΔ ADC 72 for application to the minuend input of the digital subtractor 861 and to the input of the digital framestore 862. Digital samples read from the output of the digital framestore 862 are applied as the subtrahend input of the digital subtractor 861. The subtractor 861 and the framestore 862 together form a highpass frame-comb filter, supplying at the output of the subtractor 861 a highpass frame-comb filter response to the digital samples received at the input terminal 860. The highpass frame-comb filter response from the output of the subtractor 861, in which response luma components descriptive of static image are suppressed, is supplied to a block 863 of circuitry. This block 863 of circuitry comprises a highpass line-comb filter for further filtering the highpass frame-comb filter response from the subtractor 861, symbol decision circuitry 87 following the highpass line-comb filter, and a post-line-comb-filter partial response filter 88 following the symbol decision circuitry. The circuitry in the block 863 can be similar to what is shown in any one of FIGS. 12, 13, 14, 15, 16 and 17.

The 1-frame-delayed response of framestore 862 to digital samples received at the input terminal 860 is applied to the minuend input of a digital subtractor 864 and to the write input of a further digital framestore 865. Digital samples read from the output of the digital framestore 865 are applied as the subtrahend input of the digital subtractor 864. The subtractor 864 and the framestore 865 together form a highpass frame-comb filter, supplying at the output of the subtractor 864 a highpass frame-comb filter response to the digital samples received at the input terminal 860 one frame previously. The highpass frame-comb filter response from the output of the subtractor 864, in which response luma components descriptive of static image are suppressed, is supplied to a block 866 of circuitry. This block 866 of circuitry comprises a highpass line-comb filter for further filtering the highpass frame-comb filter response from the subtractor 864, symbol decision circuitry following the highpass line-comb filter, and a post-line-comb-filter partial-response filter following the symbol decision circuitry. The highpass line-comb filters in blocks 863 and 866 are similar in structure, and the post-line-comb-filter partial-response filters in blocks 863 and 866 are similar in structure. The symbol decision circuitry in block 866 differs from that in block 863, 3-level symbol decision circuitry being replaced by 5-level symbol decision circuitry, and 5-level symbol decision circuitry being replaced by 9-level symbol decision circuitry.

The bit-serial digital signal supplied from the block 866 of circuitry is applied to a post-frame-comb-filter partial-response filter, shown in FIG. 14 as comprising a two-input exclusive-OR gate 867 and a one-bit-deep digital framestore 868. The block 866 of circuitry supplies its bit-serial output signal to the first input of the XOR gate 867. The output of the XOR gate 867 connects to the first input of a two-input multiplexer 869, the second input of which is connected for receiving the bit-serial output signal of the block 863 of circuitry. The output of the multiplexer 869 supplies a selected bit-serial output signal to the rate buffer 89 via an output terminal 870, and this selected bit-serial output signal is supplied to the write input of the framestore 868 in the post-frame-comb-filter partial-response filter and one frame later is applied from the read output of the framestore 868 to the second input of the XOR gate 867. One skilled in the art of digital design will understand that the rate buffer 89 may be written with selected bit-serial output signal on alternate frames such that the selected bit-serial output signal as delayed by a single frame can be read back to the second input of the XOR gate 867 without need for a separate one-bit-deep digital framestore 868.

The difference output signals of the subtractors 861 and 864 are supplied as the respective input signals of absolute-value circuits 871 and 872. The absolute-value responses of the circuits 871 and 872 are compared by a digital comparator 873 in order to develop a control signal for the multiplexer 869, which control signal selects which of the signals the multiplexer 869 receives at its first and second inputs will be replicated in its output signal.

When the response from the absolute-value circuit 871 is less than the response from the absolute-value circuit 872, this is indicative that the highpass frame-comb filtering by the subtractor 861 and the framestore 862 reduces the remnant composite video signal accompanying digital data better than the highpass frame-comb filtering by the subtractor 864 and the framestore 865 does. Accordingly, the digital comparator 873 supplies a control signal to the multiplexer 869 conditioning its output signal to replicate its second input signal as supplied from the block 863 of circuitry. Operation resembles that of the FIG. 12, 12, 13, 14, 15 or 16 circuitry duplicated by the subtractor 861, the framestore 862 and the block 863 of circuitry.

When the response from the absolute-value circuit 871 exceeds the response from the absolute-value circuit 872, this is indicative that the highpass frame-comb filtering by the subtractor 861 and the framestore 862 does not reduce the remnant composite video signal accompanying digital data as well as the highpass frame-comb filtering by the subtractor 864 and the framestore 865 does. Accordingly, the digital comparator 873 supplies a control signal to the multiplexer 869 conditioning its output signal to replicate its first input signal as supplied from the XOR gate 867.

The data transmission schemes described in this specification provide for a single, reasonably-wideband data transmission channel. A variety of different services can be provided via this single data transmission channel using time-division-multiplex schemes of various types. For example, data can be transmitted in packets with each successive packet being provided header information for indicating the nature of the data service provided and the originator of the data service. The television broadcasters and the cablecaster can be originators of various data services. In two-way data transmission schemes the packet heading identifying the originator can be used for selecting the proper data return channel, such as a telephone link or a dedicated channel in a cablecast system.

The data transmission schemes described in this specification are readily adapted to provide for relatively narrowband data transmission channel, or for a plurality of narrowband data transmission channels at different carrier frequencies. Such transmission schemes are accommodated by reducing the symbol rate to a rate that can be transmitted through the narrower data transmission channel and by using frequency-selective filtering at appropriate points in the transmitter and receiver. The frequency-selective filtering in the digital-signal receiver advantageously reduces the amplitude of the composite video signal remnants interfering as a jamming signal with the modulated data carrier. The use of frequency-selective filtering before the analog-to-digital converter in the digital-signal receiver advantageously reduces the dynamic range of input signal that the converter must accommodate in order not to be overloaded by analog composite video signal components that accompany the relatively low-power signals encoding digital information.

The embodiments of the invention currently preferred by the inventor have been described, but one skilled in the art of communications systems, transmitter and receiver design will be enabled by acquaintance with the foregoing disclosure to design a number of alternative embodiments of the invention; and this should be borne in mind when construing the scope of the claims which follow this specification.

What is claimed is:

1. A data signal transmitted simultaneously with a television signal through the same television transmission channel; said television signal comprising a video carrier the amplitude of which is modulated in accordance with a video signal descriptive of the scanning of a succession of image frames as scanned one scan line after another at a prescribed video line rate, or scan line frequency; said image frames occurring at a prescribed video frame rate; said data signal modulating a data carrier having a frequency differing from that of said video carrier by a prescribed frequency offset, and having no image on the other side of said video carrier; said data signal having a symbol rate that is a multiple of said prescribed video line rate, having data frames occurring at a data frame rate that is the same as said video frame rate, and customarily having each of the symbols in said data signal that are transmitted in each of alternate data frames being transmitted again but in opposite phase during the next data frame.

2. A data signal as set forth in claim 1, wherein said prescribed offset in frequency from said video carrier is one-half an odd multiple of said prescribed scan line frequency.

3. A method for operating a transmitter for transmitting a data signal and a television signal simultaneously through the same television transmission channel, said method comprising the steps of:

generating said television signal, which step includes substeps of generating a video carrier and modulating the amplitude of said video carrier in accordance with a video signal descriptive of the scanning of a succession of image frames as scanned one scan line after another at a prescribed video line rate, or scan line frequency, said image frames occurring at a prescribed video frame rate;

generating a suppressed data carrier, having a frequency differing from that of said video carrier by a prescribed frequency offset, and having no image on the other side of said video carrier;

generating amplitude modulation sidebands of said data carrier in response to said data signal; and generating said data signal so as to have a symbol rate that is a multiple of said prescribed video line rate, so as to have data frames occurring at a data frame rate that is the same as said video frame rate, and so as customarily to have each of the symbols in said data signal that are transmitted in each of alternate data frames by modulation of said suppressed data carrier transmitted again but in opposite phase during the next data frame.

4. A transmitter for transmitting a data signal and a television signal simultaneously through the same television transmission channel; said television signal comprising a video carrier the amplitude of which is modulated in accordance with a video signal descriptive of the scanning of a succession of image frames as scanned one scan line after another at a prescribed video line rate, or scan line frequency; said image flames occurring at a prescribed video frame rate; said data signal modulating a suppressed data carrier having a frequency differing from that of said video carrier by a prescribed frequency offset, and having no image on the other side of said video carrier; said data signal having a symbol rate that is a multiple of said prescribed video line rate, having data frames occurring at a data frame rate that is the same as said video frame rate, and having each of the symbols of said data signal that are transmitted in each of alternate data frames being customarily transmitted in opposite phase during the next data frame; said transmitter comprising:

a station sync generator for generating horizontal synchronizing pulses at a prescribed time in each scan line of said video signal and for generating vertical synchronizing pulses at a prescribed time in each field of said video signal;

an amplitude modulator for generating amplitude-modulation sidebands of said video carrier in accordance with said video signal, said horizontal synchronizing pulses, and said vertical synchronizing pulses;

a first symbol clocking signal generator receiving said horizontal synchronizing pulses as a control signal and generating first symbol clocking signals, which said first symbol clocking signals are supplied at a first symbol rate locked in frequency and phase to a multiple of said prescribed video line rate;

a modulo-two frame counter for counting selected ones of said vertical synchronizing pulses to provide a modulo-two frame count defining data frames as being odd or even;

a frame repeater receptive of bits of data for supplying in bit-serial format a data frame of said bits at said first symbol rate during each odd data frame and for supplying in bit-serial format an identical data frame of said bits at said first symbol rate during the next even data frame;

an exclusive-OR gate, receiving as a first input signal thereto the bits supplied at said first symbol rate from said frame repeater, receiving as a second input signal thereto said modulo-two frame count, and generating an exclusive-OR gate response;

phase shift keying circuitry for generating amplitude-modulation sidebands of said suppressed data carrier in accordance with exclusive-OR gate response; and a frequency multiplexer, receiving at least a portion of the amplitude-modulation sidebands of said video carrier as a first input signal thereof, receiving at least a portion of the amplitude-modulation sidebands of said suppressed data carrier as a second input signal thereof, and supplying an output signal combining its first and second input signals for simultaneous transmission through the same television transmission channel.

5. A transmitter as set forth in claim 4 further comprising:

a forward error correction coder receptive of digital signal for generating data in forward error correction coded form; and means for interleaving said data in forward error correction coded form for use by said frame repeater.

6. A transmitter as set forth in claim 5 wherein said frame repeater and said means for interleaving said data in forward error correction coded form for use by said frame repeater together comprise:

a second symbol clocking signal generator receiving said first symbol clocking signals as a control signal and generating second symbol clocking signals, which said second symbol clocking signals are supplied at a second symbol rate that is one-half said first symbol rate;

a symbol-per-column counter counting at said second symbol rate to generate a symbol-per-column count, reset at the beginning of each data frame and after every $m^{th}$ count, where m is the number of scan lines of said video signal per frame thereof;

a data column counter, reset at the beginning of each data frame and counting the number of times said symbol-per-column counter is reset in each data frame to generate a data column count, said data column count and said symbol-per-column count together providing a write address signal;

a symbol-per-row counter counting at said first symbol rate to generate a symbol-per-row count, reset at the beginning of each data frame and after every $n^{th}$ count, where n is the number of symbols per scan line of said video signal;

a data row counter, reset at the beginning of each data frame and counting the number of times said symbol-per-row counter is reset in each data frame to generate a data row count, said data row count and said symbol-per-row count together providing a read address signal;

a modulo-two frame-pair counter stage for counting successive non-overlapping pairs of frames to generate a modulo-two frame-pair count;

an address multiplexer controlled by said modulo-two frame-pair count for selecting as first and second output signals therefrom separate ones of said write address and said read address signals supplied as first and second input signals thereto, said address multiplexer responding to said modulo-two frame-pair count being a ONE for selecting said read address signal as said first output signal therefrom and said write address signal as said second output signal therefrom, and said address multiplexer responding to said modulo-two frame-pair count being a ZERO for selecting said write address signal as said first output signal therefrom and said read address signal as said second output signal therefrom;

a first framestore random-access memory addressed by the first output signal from said address multiplexer, conditioned for being written by said data in forward error correction coded form when said modulo-two frame-pair count is ZERO, and conditioned for reading said data in interleaved forward error correction coded form to said exclusive-OR gate as its said first input signal when said modulo-two frame-pair count is ONE; and a second framestore random-access memory addressed by the first output signal from said address multiplexer, conditioned for being written by said data in forward error correction coded form when said modulo-two frame-pair count is ONE, and conditioned for reading said data in interleaved forward error correction coded form to said exclusive-OR gate as its said first input signal when said modulo-two frame-pair count is ZERO.

7. A transmitter as set forth in claim 4, 5 or 6, wherein said prescribed offset in frequency from said video carrier is one-half an odd multiple of said prescribed scan line frequency.

8. A transmitter as set forth in claim 4, 5 or 6, wherein said phase shift keying circuitry is of a type for generating amplitude-modulation sidebands of an in-phase data carrier for a first set of data symbols and amplitude-modulation sidebands of a quadrature-phase data carrier for a second set of data symbols.

9. A transmitter as set forth in claim 8, wherein said prescribed offset in frequency from said video carrier is one-half an odd multiple of said prescribed scan line frequency.

10. A transmitter as set forth in claim 9, wherein said video carrier has a chroma subcarrier subject to modulation by chrominance signals; and wherein said prescribed offset in frequency from said video carrier places said data carrier between said video carrier and said chroma subcarrier in frequency, at a frequency sufficiently removed from the frequency of said chroma subcarrier that most sideband energy of said data carrier arising from its modulation is below most of the sideband energy of said chroma subcarrier to avoid interference with modulation of said chroma subcarrier by chrominance signals.

11. A transmitter as set forth in claim 9, wherein said video carrier has a chroma subcarrier subject to modulation by chrominance signals; and wherein said prescribed offset in frequency from said video carrier places said data carrier between said video carrier and said chroma subcarrier in frequency, at a frequency sufficiently removed from the frequency of said chroma subcarrier that most sideband energy of said data carrier arising from its modulation is below most of the sideband energy of said chroma subcarrier to avoid interference with modulation of said chroma subcarrier by chrominance signals.

12. A transmitter as set forth in claim 4, 5 or 6, wherein said phase shift keying circuitry is of a type for generating an upper sideband of binary phase-shift-keyed data carrier and for suppressing most of a lower sideband of said binary phase-shift-keyed data carrier.

13. A transmitter as set forth in claim 12, wherein said prescribed offset in frequency from said video carrier is one-half an odd multiple of said prescribed scan line frequency.

14. A transmitter as set forth in claim 13, wherein said prescribed offset in frequency from said video carrier places said data carrier below said video carrier in frequency.

15. A transmitter as set forth in claim 12, wherein said prescribed offset in frequency from said video carrier places said data carrier below said video carrier in frequency.

16. A transmitter as set forth in claim 15, wherein said upper sideband of binary phase-shift-keyed data carrier occupies a frequency range extending above the frequency of said video carrier.

17. A transmitter as set forth in claim 4, 5 or 6, wherein said prescribed offset in frequency from said video carrier places said data carrier above said video carrier in frequency, and wherein said phase shift keying circuitry is of a type for generating a lower sideband of binary phase-shift-keyed data carrier and for suppressing most of an upper sideband of said binary phase-shift-keyed data carrier.

18. A transmitter as set forth in claim 17, wherein said prescribed offset in frequency from said video carrier is one-half an odd multiple of said prescribed scan line frequency.

19. A transmitter as set forth in claim 17, wherein said video carrier has a chroma subcarrier subject to modulation by chrominance signals; and wherein said prescribed offset in frequency from said video carrier places said data carrier between said video carrier and said chroma subcarrier in frequency, at a frequency sufficiently removed from the frequency of said chroma subcarrier that most sideband energy of said data carrier arising from its modulation is below most of the sideband energy of said chroma subcarrier to avoid interference with modulation of said chroma subcarrier by chrominance signals, but at a frequency closer to the frequency of said chroma subcarrier than to the frequency of said video carrier.

20. A system for transmitting a modulated video carrier and a modulated data carrier over a common transmission channel, the amplitude of said video carrier being modulated in accordance with a composite video signal descriptive of image frames scanned with successive scan lines occurring at a prescribed scan line rate or scan line frequency, said composite video signal comprising a baseband luminance signal and a color subcarrier modulated by color difference signal components, each said image frame comprising a prescribed integral number at least one of image fields, said system comprising:

a sync generator for generating horizontal scan synchronization signals at a prescribed interval in each of said successive scan lines occurring at said prescribed scan line rate, for generating vertical synchronization signals at prescribed intervals in said image frames, for generating data frame synchronization signals, for generating first symbol clock signals at a first symbol clock rate that is a multiple over a hundred of said prescribed scan line rate, and for generating data column synchronization signals;

a video carrier generator for generating said video carrier;

a vestigial-sideband amplitude-modulation transmitter for modulating the amplitude of said video carrier in accordance with said composite video signal and supplying a resulting vestigial-sideband amplitude-modulated video carrier for transmission over said common transmission channel;

a data carrier generator for generating said data carrier with a prescribed offset in frequency from said video carrier;

phase shift keying circuitry for phase shift keying said data carrier in accordance with a processed data signal and supplying a resulting phase-shift-keyed data carrier for transmission over said common transmission channel;

a source of data with forward error correction coding, supplied in a bit stream;

a rate buffer for receiving said bit stream for temporary storage and clocking the bits of said bit stream out of said rate buffer during alternate image frames at said first symbol clock rate in response to said first symbol clock signals generated by said sync generator;

a frame repeater receptive of the bits of said bit stream clocked out of said rate buffer during alternate image frames at said first symbol clock rate, for repeating the bits of said bit stream clocked out of said rate buffer during alternate data frames during the respective frames immediately following each of said alternate data frames;

logic for bit-complementing the bits in every other data frame supplied from said frame repeater, thereby generating said processed data signal supplied to said phase shift keying circuitry.

21. A system for transmitting a modulated video carrier and a modulated data carrier over a common transmission channel, as set forth in claim 20, wherein said prescribed offset in frequency from said video carrier is one-half an odd multiple of said prescribed scan line frequency.

22. A transmitter as set forth in claim 20 or 21, wherein said phase shift keying circuitry is of a type for generating amplitude-modulation sidebands of an in-phase data carrier and amplitude-modulation sidebands of a quadrature-phase data carrier.

23. A transmitter as set forth in claim 22, wherein said prescribed offset in frequency from said video carrier places said data carrier between said video carrier and said chroma subcarrier in frequency, at a frequency sufficiently removed from said chroma subcarrier to avoid interference with its said modulation by chrominance signals.

24. A transmitter as set forth in claim 20 or 21, wherein said phase shift keying circuitry is of a type for generating an upper sideband of binary phase-shift-keyed data carrier and for suppressing most of a lower sideband of said binary phase-shift-keyed data carrier.

25. A transmitter as set forth in claim 24, wherein said prescribed offset in frequency from said video carrier places said data carrier below said video carrier in frequency.

26. A transmitter as set forth in claim 25, wherein said upper sideband of binary phase-shift-keyed data carrier occupies a frequency range extending above the frequency of said video carrier.

27. A transmitter as set forth in claim 20 or 21, wherein said prescribed offset in frequency from said video carrier places said data carrier above said video carrier in frequency, and wherein said phase shift keying circuitry is of a type for generating an lower sideband of binary phase-shift-keyed data carrier and for suppressing most of an upper sideband of said binary phase-shift-keyed data carrier.

28. A transmitter as set forth in claim 27, wherein said prescribed offset in frequency from said video carrier places said data carrier at a frequency sufficiently removed from said chroma subcarrier to avoid interference with its said modulation, but at a frequency closer to the frequency of said chroma subcarrier than to the frequency of said video carrier.

29. A system for transmitting a modulated video carrier and a modulated data carrier over a common transmission channel, the amplitude of said video carrier being modulated in accordance with a composite video signal descriptive of image frames scanned with successive video scan lines occurring at a prescribed video scan line frequency, said composite video signal comprising a baseband luminance signal and a color subcarrier modulated by color difference signal components, each said image frame comprising a prescribed integral number at least one of image fields, said system comprising:

a sync generator for generating horizontal scan synchronization signals at a prescribed interval in each of said successive video scan lines occurring at said prescribed video scan line rate, for generating vertical scan synchronization signals at a prescribed interval in each of said image fields, for generating data frame synchronization signals, for generating first symbol clock signals at a first symbol clock rate over a hundred times said prescribed video scan line rate, for generating second symbol clock signals at a second symbol clock rate that is one half said first symbol clock rate, and for generating data column synchronization signals at a rate that is a submultiple of said second symbol clock rate by a factor equal to the number of said successive scan lines in each frame, each of said data frame synchronization signals being generated concurrently with one of said horizontal scan synchronization signals and with one of said data column synchronization signals;

a video carrier generator for generating said video carrier;

a vestigial-sideband amplitude-modulation transmitter for modulating the amplitude of said video carrier in accordance with said composite video signal and supplying a resulting vestigial-sideband amplitude-modulated video carrier for transmission over said common transmission channel;

a data carrier generator for generating said data carrier with a prescribed offset in frequency from said video carrier;

phase shift keying circuitry for phase shift keying said data carrier in accordance with a processed data signal and supplying a resulting phase-shift-keyed data carrier for transmission over said common transmission channel;

a frame counter for counting said data frame synchronization signals to provide a modulo-four frame count, said modulo-four frame count having as a less significant bit thereof a modulo-two frame count defining image frames as being odd or even, and said modulo-four frame count having as a more significant bit thereof a modulo-two frame-pair count of successive non-overlapping pairs of frames;

a symbol-per-column counter, counting at said second symbol clock rate to generate a symbol-per-column count, and being reset to an initial count thereof in response to each of said data column synchronization signals;

a data column counter, counting said data column synchronization signals to generate a data column count, and being reset to an initial count thereof in response to each of said data frame synchronization signals, said data column count and said symbol-per-column count together providing a write address signal;

a symbol-per-row counter, counting at said first symbol rate to generate a symbol-per-row count, and being reset to an initial count thereof in response to each of said horizontal scan synchronization signals;

a data row counter, counting the number of said horizontal scan synchronization signals in each data frame to generate a data row count, and being reset to an initial count thereof in response to each of said data frame synchronization signals, said data row count and said symbol-per-row count together providing a read address signal;

a source of forward-error-correction-coded data, supplied in a first bit stream clocked at said second symbol clock rate;

an exclusive-OR gate connected for receiving as a first input signal thereto a second bit stream clocked at said first symbol clock rate, receiving as a second input signal thereto said modulo-two frame count, and supplying an exclusive-OR gate response to said phase shift keying circuitry as said processed data signal;

an address multiplexer controlled by said modulo-two frame-pair count for selecting as first and second output signals therefrom separate ones of said write address and said read address signals supplied as first and second input signals thereto, said address multiplexer responding to said modulo-two frame-pair count being a ONE for selecting said read address signal as said first output signal therefrom and said write address signal as said second output signal therefrom, and said address multiplexer responding to said modulo-two frame-pair count being a ZERO for selecting said write address signal as said first output signal therefrom and said read address signal as said second output signal therefrom;

a first framestore random-access memory addressed by the first output signal from said address multiplexer, conditioned when said modulo-two frame-pair count is ZERO for being written with said forward-error-correction-coded data supplied in said first bit stream, and conditioned when said modulo-two frame-pair count is ONE for reading said forward-error-correction-coded data clocked at said first symbol clock rate to said exclusive-OR gate as its said first input signal; and a second framestore random-access memory addressed by the first output signal from said address multiplexer, conditioned when said modulo-two frame-pair count is ONE for being written with said forward-error-correction-coded data supplied in said first bit stream, and conditioned when said modulo-two frame-pair count is ZERO for reading said forward-error-correction-coded data docked at said first symbol clock rate to said exclusive-OR gate as its said first input signal.

30. A system for transmitting a modulated video carrier and a modulated data carrier over a common transmission channel, as set forth in claim 29, wherein said prescribed offset in frequency from said video carrier is one-half an odd multiple of said prescribed scan line frequency.

31. A method as set forth in claim 3, wherein said steps of generating a suppressed data carrier and generating amplitude modification sidebands of said data carrier are carried out by phase-shift keying of said data carrier in response to said data signal.

32. A method for operating a transmitter for transmitting a data signal and a television signal simultaneously through the same television transmission channel, said method comprising the steps of:

generating said television signal, which step includes substeps of generating a video carrier and modulating the amplitude of said video carrier in accordance with a video signal descriptive of the scanning of a succession of image frames as scanned one scan line after another at a prescribed video line rate, or scan line frequency, said image frames occurring at a prescribed video frame rate;

generating a suppressed data carrier, having a frequency differing from that of said video carrier by a prescribed frequency offset, and having no image on the other side of said video carrier;

generating amplitude modulation sidebands of said data carrier by binary phase shift keying thereof in response to said data signal, which step of generating amplitude modulation sidebands of said data carrier includes substeps of generating an upper sideband of the binary phase-shift-keyed data carrier, and suppressing most of a lower sideband of said binary phase-shift-keyed data carrier; and generating said data signal so as to have a symbol rate that is a multiple of said prescribed video line rate, so as to have data frames occurring at a data frame rate that is the same as said video frame rate, and so as customarily to have each of the symbols in said data signal that are transmitted in each of alternate data frames by modulation of said suppressed data carrier transmitted in opposite phase during the next data frame.

33. A method as set forth in claim 32, wherein said prescribed offset in frequency from said video carrier places said data carrier below said video carrier in frequency.

34. A method as set forth in claim 33, wherein said upper sideband of binary phase-shift-keyed data carrier occupies a frequency range extending above the frequency of said video carrier.

35. A method as set forth in claim 3, wherein said prescribed offset in frequency from said video carrier places said data carrier above said video carrier in frequency, and wherein said phase shift keying of said data carrier is binary phase shift keying in which said step of generating amplitude modulation sidebands of said data carrier in response to said data signal includes substeps of:

generating a lower sideband of the binary phase-shift-keyed data carrier, and suppressing most of an upper sideband of said binary phase-shift-keyed data carrier.

36. A method as set forth in claim 35, wherein said step of generating said television signal includes the further substep of generating a chroma subcarrier of said video carrier, which chroma subcarrier is subject to modulation by chrominance signals, and wherein said prescribed offset in frequency from said video carrier places said data carrier between said video carrier and said chroma subcarrier in frequency, at a frequency sufficiently removed from the frequency of said chroma subcarrier that most sideband energy of said data carrier arising from its modulation is below most of the sideband energy of said chroma subcarrier, to avoid interference with modulation of said chroma subcarrier by chrominance signals.

37. A method for operating a transmitter for transmitting a data signal and a television signal simultaneously through the same television transmission channel, said method comprising the steps of:

generating said television signal, which step includes substeps of generating a video carrier and modulating the amplitude of said video carrier in accordance with a video signal descriptive of the scanning of a succession of image frames as scanned one scan line after another at a prescribed video line rate, or scan line frequency, said image frames occurring at a prescribed video frame rate;

generating a suppressed data carrier, having a frequency differing from that of said video carrier by a prescribed frequency offset, and having no image on the other side of said video carrier;

generating amplitude modulation sidebands of said data carrier, which step includes substeps of generating amplitude-modulation sidebands of an in-phase component of said data carrier in response to its phase-shift keying in response to a first set of data symbols from said data signal, and generating amplitude-modulation sidebands of a quadrature-phase component of said data carrier in response to its phase-shift keying in response to a second set of data symbols from said data signal; and generating said data signal so as to have a symbol rate that is a multiple of said prescribed video line rate, so as to have data frames occurring at a data frame rate that is the same as said video frame rate, and so as customarily to have each of the symbols in said dater signal that are transmitted in each of alternate data frames by modulation of said suppressed data carrier transmitted in opposite phase during the next data frame.

38. A method as set forth in claim 37, wherein said step of generating said television signal includes the further substep of generating a chroma subcarrier of said video carrier, which chroma subcarrier is subject to modulation by chrominance signals, and wherein said prescribed offset in frequency from said video carrier places said data carrier between said video carrier and said chroma subcarrier in frequency, at a frequency sufficiently removed from the frequency of said chroma subcarrier to avoid interference with its said modulation by chrominance signals.

39. A method for operating a transmitter for transmitting a data signal and a television signal simultaneously through the same television transmission channel, said method comprising the steps of:

generating said television signal, which step includes substeps of generating a video carrier, generating an audio carrier to accompany said video carrier to be frequency-modulated by an audio signal, and modulating the amplitude of said video carrier in accordance with a video signal descriptive of the scanning of a succession of image frames as scanned one scan line after another at a prescribed video line rate, or scan line frequency, said image frames occurring at a prescribed video frame rate;

generating a suppressed data carrier, having a frequency differing from that of said video carrier by a prescribed frequency offset, and having no image on the other side of said video carrier, the frequency of said video carrier being between the frequency of said audio carrier and the frequency of said data carrier;

generating amplitude modulation sidebands of said data carrier in response to said data signal; and generating said data signal so as to have a symbol rate that is a multiple of said prescribed video line rate, so as to have data frames occurring at a data frame rate that is the same as said video frame rate, and so as customarily to have each of the symbols in said data signal that are transmitted in each of alternate data frames by modulation of said suppressed data carrier transmitted in opposite phase during the next data frame.

40. A method as set forth in any one of claims 31 and 32–39, wherein said prescribed offset in frequency from said video carrier is one-half an odd multiple of said prescribed scan line frequency.

41. A transmitter as set forth in claim 12, wherein the frequencies of a first set of said amplitude-modulation sidebands of said video carrier and the frequencies of a second set of said amplitude-modulation sidebands of said video carrier are on opposite sides of the frequency of said video carrier, wherein the frequencies of the second set of said amplitude-modulation sidebands of said video carrier more remote from the frequency of said video carrier are suppressed by filtering to leave vestigial sideband amplitude modulation, and wherein said prescribed offset in frequency from said video carrier places the frequency of said data carrier on the same side of the frequency of said video carrier as said second of said amplitude-modulation sidebands of said video carrier.

* * * * *